(12) United States Patent
Oropeza

(10) Patent No.: US 12,492,721 B2
(45) Date of Patent: Dec. 9, 2025

(54) LEVELING FASTENER WITH EXPANDABLE RIVET

(71) Applicant: Juan Cristobal Oropeza, Tampa, FL (US)

(72) Inventor: Juan Cristobal Oropeza, Tampa, FL (US)

( * ) Notice: Subject to any disclaimer, the term of this patent is extended or adjusted under 35 U.S.C. 154(b) by 267 days.

(21) Appl. No.: 18/299,573

(22) Filed: Apr. 12, 2023

(65) Prior Publication Data

US 2023/0243383 A1 Aug. 3, 2023

Related U.S. Application Data

(63) Continuation-in-part of application No. 17/992,530, filed on Nov. 22, 2022, now Pat. No. 12,228,167.

(60) Provisional application No. 63/283,239, filed on Nov. 25, 2021.

(51) Int. Cl.
  *F16B 35/04* (2006.01)
  *F16B 37/06* (2006.01)

(52) U.S. Cl.
  CPC ............ *F16B 35/041* (2013.01); *F16B 35/04* (2013.01); *F16B 37/065* (2013.01)

(58) Field of Classification Search
  CPC ...... F16B 5/0233; F16B 5/0283; F16B 35/04; F16B 37/065; F16B 41/002; F16B 37/044
  USPC .................................. 411/107, 183, 999, 113
  See application file for complete search history.

(56) References Cited

U.S. PATENT DOCUMENTS

| | | | | |
|---|---|---|---|---|
| 4,182,091 A | * | 1/1980 | Fischer | F16B 5/0283 403/252 |
| 4,212,224 A | * | 7/1980 | Bragg, Jr. | F16B 35/048 411/113 |
| 4,921,382 A | * | 5/1990 | Fries | F16B 5/0283 411/72 |
| 4,930,959 A | * | 6/1990 | Jagelid | F16B 5/0283 411/533 |
| 5,234,300 A | * | 8/1993 | Fluckiger | F16B 5/0283 411/383 |
| 5,785,449 A | * | 7/1998 | DiBene | H05K 7/1407 411/105 |
| 9,334,888 B2 | * | 5/2016 | Flückiger | F16B 5/0283 |
| 2008/0226420 A1 | * | 9/2008 | Huang | F16B 5/0283 411/352 |

(Continued)

*Primary Examiner* — Flemming Saether
(74) *Attorney, Agent, or Firm* — Menlo Park Patents; Thomas E. Ciesco

(57) ABSTRACT

A leveling fastener for adjustably securing a first member to a second member. The leveling fastener includes a cylindrical shank body having a fastener head disposed on a first end and includes a threaded portion having fastener threads extending from a fastener tip to a mid-portion of the cylindrical shank body. The cylindrical shank body includes a leveling portion extending between the fastener head and the threaded portion and a central channel extending axially along a central axis of the cylindrical shank body from the fastener head of the cylindrical shank body to at least the mid-portion of the cylindrical shank body. The leveling fastener includes a collar adjustable from a retracted position wherein the collar has a first diameter to an expanded position wherein the collar has a second diameter larger than the first diameter, the collar translatable along the leveling portion of the cylindrical shank body.

5 Claims, 27 Drawing Sheets

(56) References Cited

U.S. PATENT DOCUMENTS

2021/0301855 A1\* 9/2021 Bente .................... F16B 5/0233

\* cited by examiner

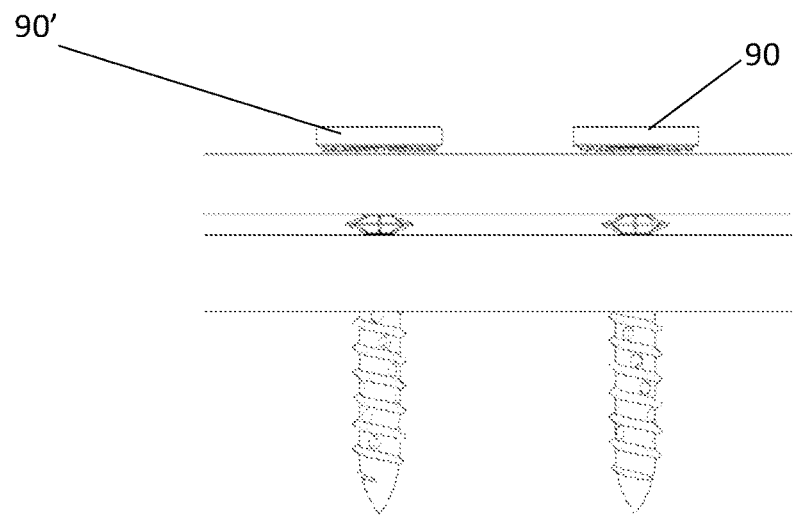
FIG. 39
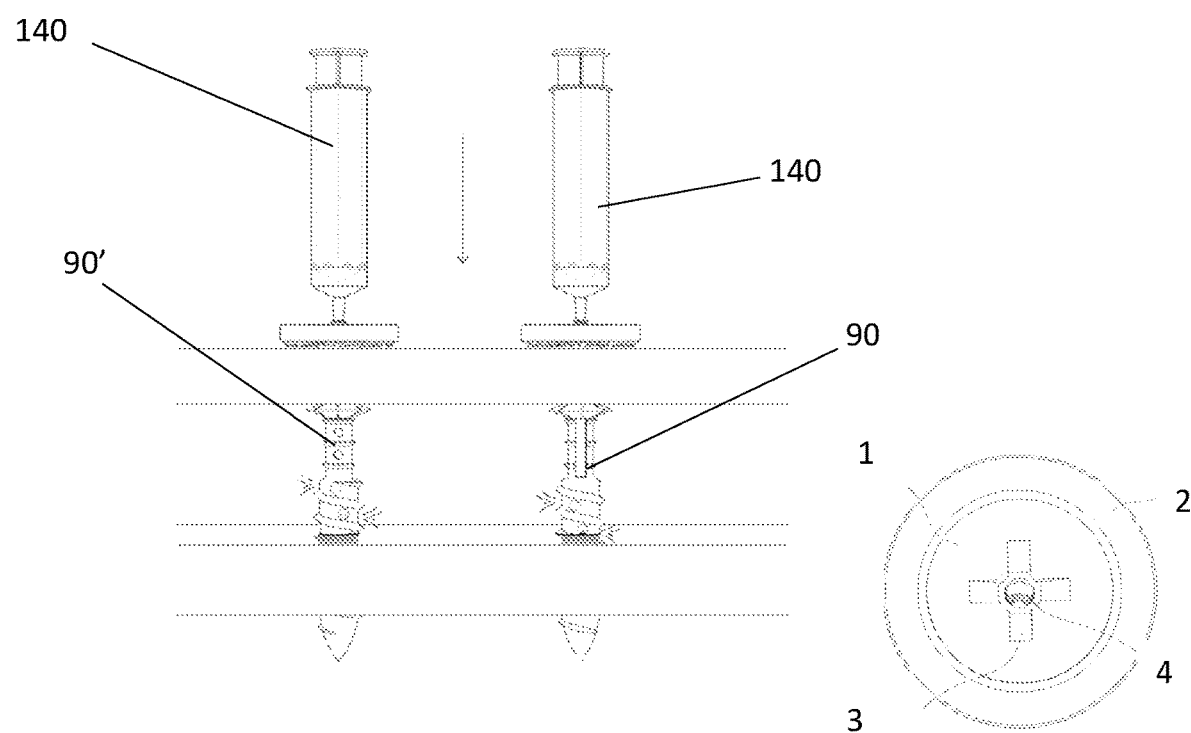
FIG. 40
FIG. 41

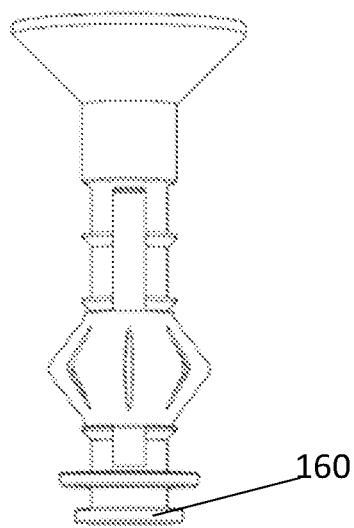
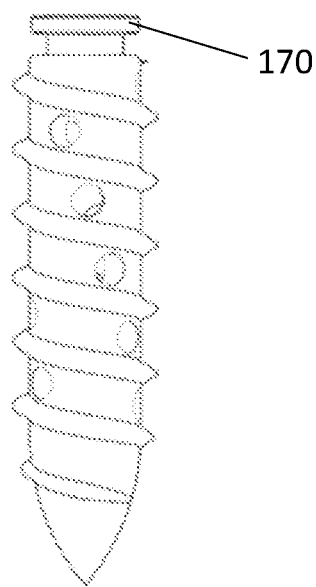
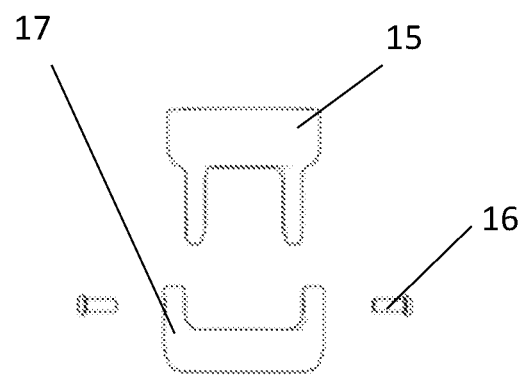
FIG. 44　　　　　　　　FIG. 45

LEVELING FASTENER WITH EXPANDABLE RIVET

CROSS-REFERENCE TO RELATED APPLICATIONS

This application is a Continuation-in Part patent application claiming priority to U.S. patent application Ser. No. 17/992,530, filed Nov. 22, 2022, which claims priority to U.S. Provisional Patent application Ser. No. 63/283,239 filed on Nov. 25, 2021, all of which are incorporated by reference herein in their entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants, make no claim to any trademarks referenced.

BACKGROUND OF THE INVENTION

Field of the Invention

The invention relates to fasteners and more specifically to fasteners which provide adjustments in the use thereof.

Description of Related Art

Currently, there are several solutions to attach two or more pieces together but they do not allow to make changes in the level or height of one piece relative to the other without losing support and grip. Some of these solutions attempt leveling or height adjustments through introduction of small pieces for example as wood shims or other material that could fill the gap between the pieces to keep them separated and give them the required level but this is very time consuming and in many cases is not practical or possible to do, due to the impossibility or undesirability to access the back part of the piece. In many cases and the only way to reach the back of a panel to put an object behind the panel is to open a hole or make a cut in the piece or panel. These solutions fail to meet the needs of the industry because as was mentioned before they take much material are time consuming and required a certain level of skill to do.

Therefore, what is clearly needed is fastener and a method that solves the problems and deficiencies mentioned above.

SUMMARY OF THE INVENTION

It is desirable to have a fastener device that allows the user to make adjustments of level and position of various pieces without losing the attachment and grip of the piece to the structure or to the other piece, thus helping to quickly and easy obtain required leveling from each piece, joint leveling or other uses that requires the adjustments of level. The problem that this invention solves apply in situations such as: installations of panels, logs adjustment, seams and joints leveling, bones leveling and adjustments of positions and any other leveling need situations when various attached pieces. In many of these situation its not possible or desired to access the back part of the panel or piece, even when time is a crucial factor and the user needs to adjust the height for joints matching or other leveling requirements fast and securely. The current fasteners available just let the pieces stay together through adjacency and compression not permitting the user to separate pieces or adjust level without losing compression, thus loosing grip or attachment.

The disclosed fastener device and associated method advantageously fill these need and addresses the aforementioned deficiencies by providing a fastener that through a locking system that makes the panels or pieces stay at certain desired height of the fastener allows the part of the fastener that its not blocking the panel or piece to continue work in its path to adjust height both up or down as the user requires. When obtaining the desired point or height of the panel or piece. The user have the possibility if required to inject through an internal channel that extends throughout the interior of the fastener a liquid for a definitive connection of the panel or pieces or any other material required to inject as the application requires.

In one embodiment is a system together with an associated mechanical process. The system is made up of a fastener body comprised by a Fastener head with Phillips or other required screwdriver shape and body thread, flat body, internal liquid channel holes for liquid and height channels for extendable arms. The system includes extendable retractable arms. The body of the fastener have height channels in which the expandable retractable arms rest and are attached. This channel is located in the middle upper narrower without thread part of the fastener and delimitate a track for the expansion or contraction of the expandable retractable arms. The thread, the internal channel for materials, side recess holes for material expulsion through the internal channel, screw head and a serrated flange. The materials for the manufacturing of the fastener could vary depending on the application for which will be used as well as the distance and the size of the components. Some of the materials that can be used to manufacture the fastener could be but are not limited to are as example: Metals, Polymers, Ceramics, Composites, etc.

The system may also have one or more of the following components: dented flange washer for added grip, a protective cap for the retractable expandable arms for applications that require protection for the articulated arms and for the material on the back part of the piece, a fixed positioned washer channel in the fastener body, a flexible body attachment attached to the fastener body through a precision and thread mechanism, a pivotable and rotatable hinge, additional pivot point for the retractable arms for smaller gaps openings and a extra hole for material expulsion in the spring channel located in the fastener body.

The disclosed system provides a fastener that help the user to adjust level from two or more pieces and with its functions also permits to rotate and move its position without losing grip and attachment from one piece to the other, this help in many real situations life as example fascia leveling repairs, dry wall repairs, seams leveling, medical bone level adjustment and many other that require a fastener that holds and keep grip and let the user level and secured the pieces even when its impractical or impossible to access the back part of the piece also letting the user to insert liquids for multiple purposes.

The disclosed system has advantages in that the overall architecture of the system is unique. More specifically, the system is unique due to the presence of the fastener blocked piece mechanism that hold in place the piece and let the fastener continue its way to the other piece to secure and leveled the height as desired by the user without having to access the back part of the pieces and also for insertion of liquids or other materials. This will lead in simplification and reduction of steps, money and time also getting a more secure way of leveling for users.

The materials for the manufacturing of the fastener could vary depending on the application for which will be used as well as the distance and the size of the components. Some of the materials that can be used to manufacture could be but are not limited to are as example: Metals, Polymers, Ceramics Composites or other material required for the application. These components are combined together to create an architecture for the system that has all the attributes and protective applications for the use of the fastener.

In another embodiment is a system together with an associated mechanical process. The system is made up of the following components: 1) Fastener Body comprised by: 1.a Fastener head with Phillips or other required screwdriver shape 2. 1.b body thread. 1b.d flat body 1.c Internal liquid chanel.1.d holes for liquid 1.e height pins for extendable collar 2) extendable retractable collar. The body of the fastener have height level pins in which the expandable retractable collar rest and lock the piece. This height level pins are located in the middle upper narrower without thread part of the fastener and delimitate a track for the expansion or contraction of the expandable retractable collar. The thread, the internal channel for materials, side recessed holes for material expulsion through the internal channel, screw head and a serrated flange. The materials for the manufacturing of the fastener could vary depending on the application for which will be used as well as the distance and the size of the components. Some of the materials that can be used to manufacture the fastener could be but are not limited to are as example: Metals, Polymers, Ceramics, Composites, etc.

The system may also have one or more of the following components: a tool open mechanism, a retractable tool for pulling the locking collar, dented flange washer for added grip, a fixed positioned washer channel in the fastener body, a flexible body attachment attached to the fastener body through a pression and thread mechanism, a pivotable and rotatable hinge.

The disclosed system is advantageous in that it provides a fastener that help the user to adjust level from two or more pieces and with its new functions also permits to rotate and move its position without losing grip and attachment from one piece to the other, this help in many real situations life as example fascia leveling repairs, dry wall repairs, seams leveling, medical bone level adjustment and many other that require a fastener that holds and keep grip and let the user level and secured the pieces even when its impractical or impossible to access the back part of the piece also letting the user to insert liquids for multiple purposes.

The disclosed system is advantageous in that the overall architecture of the system it includes (1) the fastener blocked piece mechanism that hold in place the piece and let the fastener continue its way to the other piece to secure and leveled the height as desired by the user without having to access the back part of the pieces and also for insertion of liquids or other materials. This will lead in simplification and reduction of steps, money and time also getting a more secure way of leveling for users.

The present invention relates to a fastener device and a method associated with the device. The device holds various pieces together through a blocking mechanism which block one piece at certain desired height and allows the other part of the fastener that is not blocking to continue work in its path to adjust up or down the height as the user requires. When obtaining the desired point or height the user has the possibility if required or desired to inject through a internal channel such as used in a needle to inject liquids or materials for immobilization or for other applications required. This device fastener can be used for the need of leveling and adjusting two pieces such as panels, logs, pipes, bones or any other pieces that need to be leveled without losing attachment. The core components of the invention are, which are configured as follows: Fastener body and head with thread, internal channel and holes for internal channel, retractable arms. With respect to the associated method, In order to carry out the method the following core steps are followed: With a drill or a screw driver insert the fastener through the pieces that are desired to level, as the fastener pass the first piece the retractable arms will open holding and blocking from movement the first piece, the fastener will continue its path to the second piece going through the piece, the user at this moment will decide the height required, the user will inject through the channel of the fastener any liquid required or material. Ultimately, at the conclusion of these steps the fastener will allow to adjust the height of the pieces without losing attachment to the other piece or structure thus helping quickly obtaining the leveling of joints or other leveling needed adjustments between pieces and the spread of materials and liquid or pastes solutions easily through the fastener internal channel characteristic.

Another aspect of the present invention is directed to a leveling fastener for adjustably securing a first member to a second member. The leveling fastener includes a cylindrical shank body having a fastener head disposed on a first end of the cylindrical shank body, the head engageable with a fastening tool. The cylindrical shank body includes a threaded portion having fastener threads extending from a fastener tip disposed on a second end of the cylindrical shank body opposite the first end to a mid-portion of the cylindrical shank body between the first end and the second end of the cylindrical shank body. The cylindrical shank body includes a leveling portion extending between the fastener head and the threaded portion and a central channel extending axially along a central axis of the cylindrical shank body from the fastener head of the cylindrical shank body to at least the mid-portion of the cylindrical shank body. The leveling fastener includes a collar adjustable from a retracted position wherein the collar has a first diameter to an expanded position wherein the collar has a second diameter larger than the first diameter, the collar translatable along the leveling portion of the cylindrical shank body when in the collapsed position and secured from movement when the collar is in the expanded position. The collar is in the retracted position when the fastener threads engage a first member opening in the first member. The collar is expanded when the fastener threads fully engage the second member. The first member is secured between the fastener head and the collar whereby rotating the leveling fastener in one direction moves the first member toward the second member and rotating the leveling fastener in a second direction opposite the first direction moves the first member away from the second member.

The central channel may be a fluid transport channel, the leveling fastener including at least one fluid egress port extending radially from the fluid transport channel wherein a fluid forced into the fluid transport channel at the fastener head travels through the fluid transport channel and out of the at least one fluid egress port. The fluid may be an expandable insulation, an adhesive or other construction fluid. The leveling fastener may include a slot disposed in the leveling portion and the leveling fastener may include a collar adjustment tool having a rotatable lever at one end of the collar adjustment tool, the rotatable lever extendable outwardly through a radial port extending radially from the central channel after the collar adjustment tool is guided into the central channel. The rotatable lever engages the collar wherein urging the adjustment tool away from the fastener head slides the collar toward an inner surface of the first member, locking the collar into an installed position and securing the first member between the fastener head and the collar member. Retracting the rotatable lever allows removal of the adjustment tool from the fastener central channel. The leveling fastener may include a plurality of retaining rings spaced apart and disposed on the leveling portion of the fastener, the plurality of retaining rings for retaining the collar along the leveling portion of the fastener. The leveling fastener may include a plurality of retaining rings spaced apart and disposed on the leveling portion of the fastener for retaining the collar along the leveling portion of the fastener. The collar adjustment tool allows the collar to translate along the leveling portion of the fastener when the finger is positioned in the central channel and engages the collar.

Another aspect of the present invention is directed a method for using the leveling fastener for adjustably securing a first member to a second member. The method includes drilling a first member opening in the first member and second member opening in the second member, the first member opening axially aligned with the second member opening and engaging the head of the leveling fastener with a rotary tool. The method includes engaging the fastener threads with the first member opening and using the rotary tool, rotating the leveling fastener in a first direction wherein the leveling fastener collar is in the retracted position and the leveling fastener translates into the first member and the second member. The method includes continuing rotation of the leveling fastener until the leveling fastener collar expands, engaging the first member between the expanded collar and the head wherein one of the plurality of retaining rings locks the expanded collar against a rear surface of the first member. The method includes using the rotary tool, rotating the leveling fastener in a second direction opposite the first direction until the first member is in a desired position relative to the second member; and removing the rotary tool from the level fastener head.

The method may include providing a collar adjustment tool having a rotatable lever at one end of the collar adjustment tool, the rotatable lever extendable outwardly through a radial port extending radially from the central channel after the collar adjustment tool is guided into the central channel, the rotatable lever engageable with the collar wherein urging the adjustment tool away from the fastener head slides the collar toward an inner surface of the first member securing the first member between the fastener head and the collar member and wherein retracting the rotatable lever allows removal of the adjustment tool from the fastener central channel. The method may include drilling a first member opening in the first member and second member opening in the second member, the first member opening axially aligned with the second member opening, engaging the head of the leveling fastener with a rotary tool and engaging the fastener threads with the first member opening. The method may include using the rotary tool, rotating the leveling fastener in a first direction wherein the leveling fastener translates into the first member and the second member, sliding the collar adjustment tool rotatable lever in the in the leveling fastener central opening and rotating the lever until the lever engages the collar. The method may include pulling the collar adjustment tool away from the fastener head wherein the collar is expanded and locked against the inner surface of the first member and retracting the lever from the collar and removing the collar adjustment tool from the central opening of the leveling fastener. The method may include using the rotary tool, rotating the leveling fastener in the first direction or a second direction opposite the first direction until the first member is in a desired position relative to the second member and removing the rotary tool from the level fastener head. The leveling fastener may include a plurality of retaining rings spaced apart and disposed on the leveling portion of the fastener, the plurality of retaining rings for retaining the collar along the leveling portion of the fastener. The step of pulling the collar adjustment tool away from the fastener head locks the collar against the inner surface may include at least one retaining ring locking the collar along the leveling portion of the leveling fastener. The leveling fastener may include a shaft channel extending axially through the shaft body and at least one egress port extending radially outward from the shaft channel and wherein a fluid injected into the shaft channel flows through the shaft channel and out the egress ports.

Another aspect of the present invention is directed to a leveling fastener for adjustably securing a first member to a second member, the leveling fastener comprising a shaft portion having a shaft body, external shaft treads extending along a portion of the shaft body, a shaft flange extending radially outward from a flange end of the shaft portion and a tapered end opposite the flange end. The leveling fastener includes a rivet portion having a cylindrical tube, a rivet flange extending radially outward from a first tube end of the cylindrical tube and a rivet lip extending radially inward from a second end of the cylindrical tube the second end opposite the first end wherein the rivet lip is engaged with the shaft flange. The leveling fastener includes a proximal tube portion disposed adjacent the rivet flange, a distal tube portion disposed adjacent the rivet lip and a deformable portion disposed between the proximal tube portion and the distal tube portion wherein the deformable portion expands radially outward when the distal tube portion is drawn toward the proximal tube portion of the cylindrical tube. The external shaft treads are engageable with first member opening whereby rotation of the shaft portion in one direction draws the leveling fastener into the first member opening and into a second member opening. Expansion of the deformable portion secures the first member between the rivet flange and the expanded deformable portion. Further rotation of the shaft member in the first direction draws the first member toward the second member and rotation of the shaft member in a second direction opposite the first direction urges the first member away from the second member.

The leveling fastener may include a shaft channel extending axially through the shaft body and at least one egress port extending radially outward from the shaft channel wherein a fluid injected into the shaft channel flows through the shaft channel and out the egress ports. The fluid may be an expandable insulation, an adhesive or other constructing fluid. The distal tube portion may include internal threads and the leveling fastener may include a removable rivet tool having a tool body having external tool threads engageable with the internal threads of the distal tube portion, a tool flange extending radially outward from the tool body and a tool head protruding from the tool flange, the tool head for rotating the removable rivet tool. The tool body external threads are engageable with the distal tube portion internal threads and the tool body, when rotated, urges the distal tube portion toward the proximal tube portion, locking the first member between the rivet flange and the deformable portion. A method for using the leveling fastener includes ensuring the rivet tool is engaged with the proximal tube portion, drilling a first member opening in the first member and second member opening in the second member, the first member opening axially aligned with the second member opening and engaging the tool head with a rotary tool. The method includes engaging the fastener threads with the first member opening, using the rotary tool, rotating the leveling fastener in a first direction wherein the leveling fastener translates into the first member and the second member and continuing to rotate the leveling fastener until the deformable portion expands against an inner surface of the first member. The method includes using the rotary tool, rotating the leveling fastener in the first direction or a second direction opposite the first direction until the first member is in a desired position relative to the second member and removing the rivet tool from the level fastener head. The leveling fastener may include a shaft channel extending axially through the shaft body and at least one egress port extending radially outward from the shaft channel and wherein a fluid injected into the shaft channel flows through the shaft channel and out the egress ports.

Another aspect of the present invention is directed to a fastener comprising a cylindrical shank. The cylindrical shank has a first shank end and a second shank end opposite the first shank end. The cylindrical shank has a head attached to the first shank end, the head having a tool slot for engaging a tool, the tool slot directed away from the first shank end and a lower head surface adjacent the shaft. The cylindrical shank has a head collar adjacent the head, a threaded collar having securing threads, the threaded collar disposed along a portion of the second shank end, a shank smooth portion disposed between head collar and the threaded collar and a grip washer disposed along the collar. The grip washer has a first washer side with a plurality of protrusions and a second washer side having a profile corresponding with the lower head surface, wherein the grip washer is rotatable about the collar and the lower head surface. The fastener includes a retractable frame rotatable about the shank smooth portion. The retractable frame includes a first choke slidingly engaged with the shank smooth portion toward the head collar and a second choke slidingly engaged with the shank smooth portion toward the threaded collar. The retractable frame includes a plurality of upper frame arms having a first length and pivotally attached at a first upper frame arm end to the first coke and a plurality of lower frame arm having a second length longer than the first length, the lower frame arms pivotally attached at a first lower frame member end to the second choke. The retractable frame includes a plurality of pivot pins for pivotally securing each corresponding lower frame arm second end opposite the lower frame arm first end to upper frame arm second end opposite the upper frame arm first end and a spring disposed on the shank smooth portion between the first choke and the second choke wherein the spring urges the first choke away from the second choke. The fastener may include a shank opening extending from a first shank end to a second shank end opposite the first shank end and a plurality of extrusion opening extending across the shank length and intersecting the shank opening whereby a fluid is injected in the shank opening and distributed to each of the plurality of extrusion openings. The fastener may include a protective cap disposed over the retractable frame. The fastener may include a fixed path channel for control of the retractable frame.

Another aspect of the present invention is directed to a fastener comprising an upper shank having a first upper shank end and a second upper shank end opposite the first upper shank end, a head attached to the first upper shank end, the head having a tool slot for engaging a tool, the tool slot directed away from the shank end and a lower head surface adjacent the shaft, a head collar adjacent the head, an upper shank attachment groove disposed adjacent the second upper shank end, a lower collar disposed proximate to the upper attachment groove, a shank smooth portion disposed between head collar and the threaded collar, a grip washer disposed along the collar having a first washer side having a plurality of protrusions and a second washer side having a profile corresponding with the lower head surface, wherein the grip washer is rotatable about the collar and the lower head surface and a retractable frame rotatable about the shank smooth portion. The retractable frame includes a first choke slidingly engaged with the shank smooth portion toward the head collar, a second choke slidingly engaged with the shank smooth portion toward the threaded collar and a plurality of upper frame arms having a first length and pivotally attached at a first upper frame arm end to the first coke. The retractable frame includes a plurality of lower frame arm having a second length longer than the first length, the lower frame arms pivotally attached at a first lower frame member end to the second choke, a plurality of pivot pins for pivotally securing each corresponding lower frame arm second end opposite the lower frame arm first end to upper frame arm second end opposite the upper frame arm first end and a spring disposed on the shank smooth portion between the first choke and the second choke wherein the spring urges the first choke away from the second choke. The fastener includes a lower shank having a lower shank attachment groove disposed adjacent one end of the lower shank and having securing threads along an opposite end of the lower shank. The fastener includes a rotatable hinge engageable with the upper shank attachment groove and the lower shank attachment groove for pivotably securing the upper shank with the lower shank. The fastener may include a shank opening extending from a first shank end to a second shank end opposite the first shank end and a plurality of extrusion opening extending across the shank length and intersecting the shank opening whereby a fluid is injected in the shank opening and distributed to each of the plurality of extrusion openings. The fastener may include a protective cap 33 disposed over the retractable frame. The rotatable hinge may be a flexible hose. The fastener may include a fixed path channel for control of the retractable frame.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. the locking, clamping and injection screw for leveling adjustments may, however, be embodied in many different forms and should not be construed as being limited to the embodiments set forth herein; rather, these embodiments are provided by way of illustration only and so that this disclosure will be thorough, complete and fully convey understanding to those skilled in the art. These and other objects, features, and advantages of the present invention will become more readily apparent from the attached drawings and the detailed description of the preferred embodiments, which follow.

BRIEF DESCRIPTION OF DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 39 shows a fifth step in using the leveling faster shown in FIG. 24;

FIG. 40 shows a sixth step in using the leveling faster shown in FIG. 24;

FIG. 41 shows a top plan view of the leveling fastener;

FIG. 44 is an exploded side elevational view of a two part leveling fastener showing the upper and lower sections;

FIG. 45 is a side elevational view of the two part leveling fastener universal connector;

FIG. 48 is a perspective view of the leveling portion of the fastener shown in FIG. 46.

DETAILED DESCRIPTION OF THE INVENTION

Figure 1:
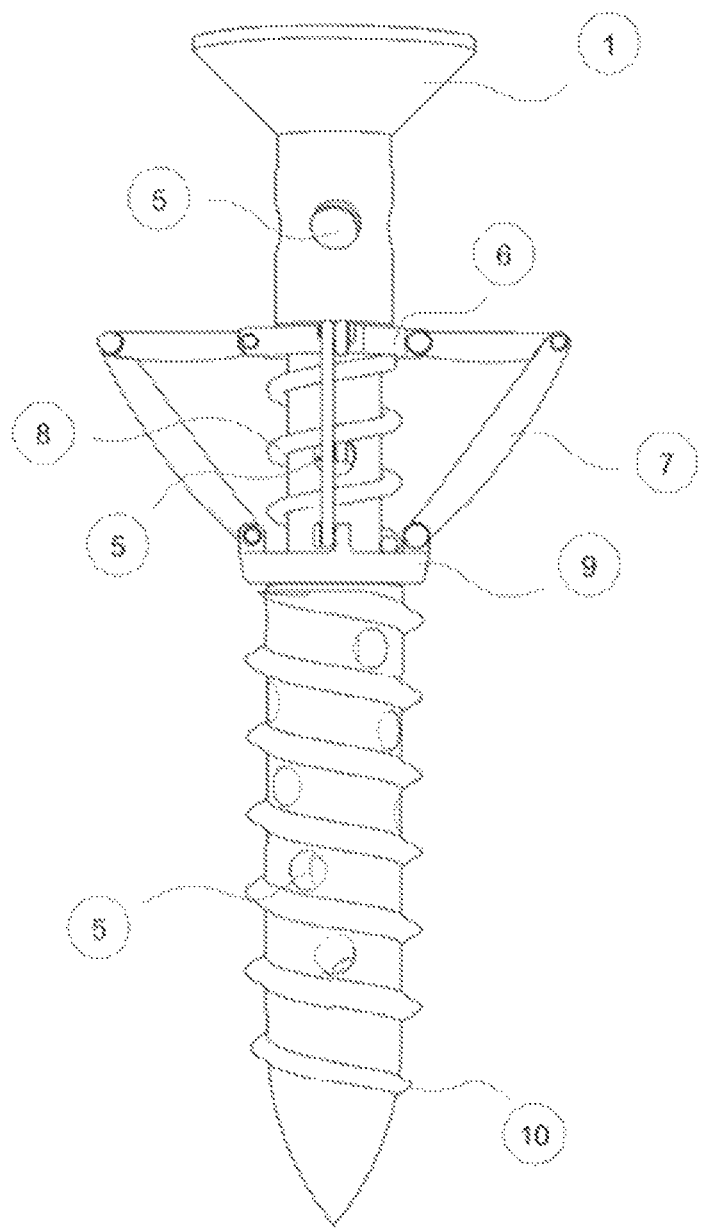
FIG. 1 is side elevational view of a leveling fastener according to the present invention.
Figure 2:
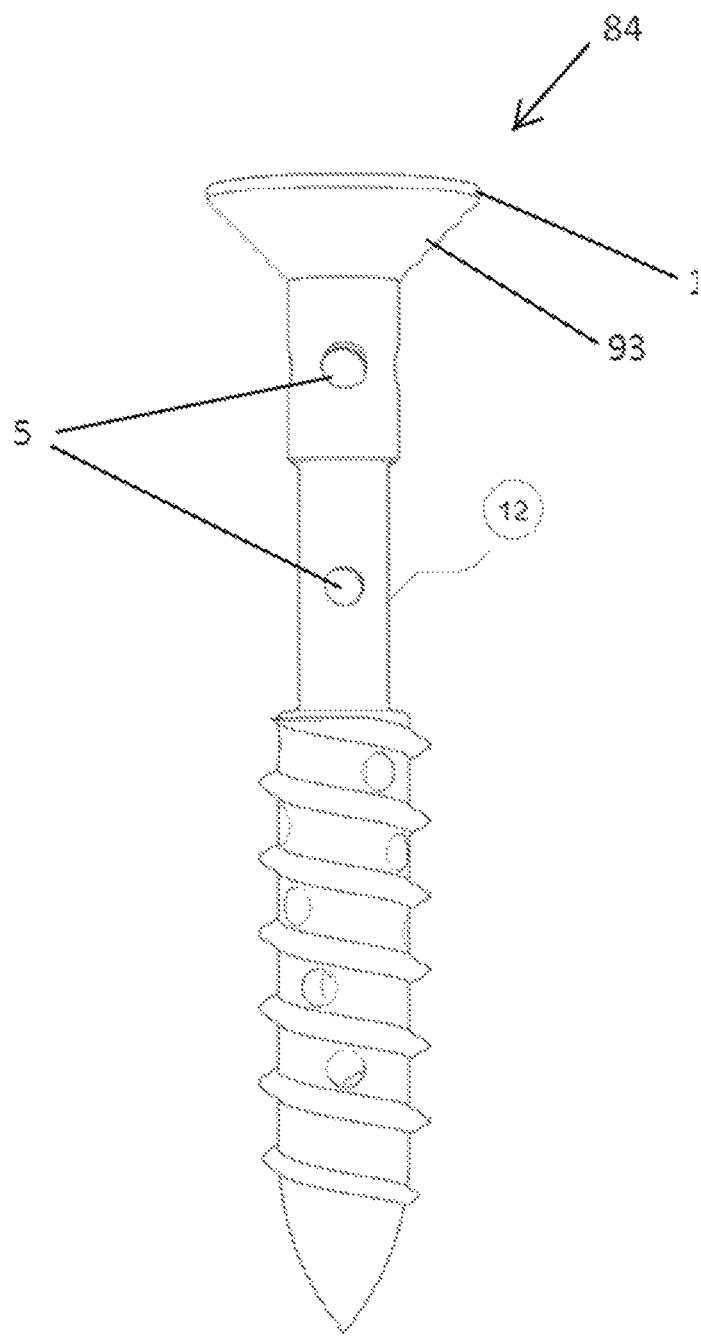
FIG. 2 is a side elevational view of the shaft portion of the leveling fastener shown in FIG. 1.
Figure 3:
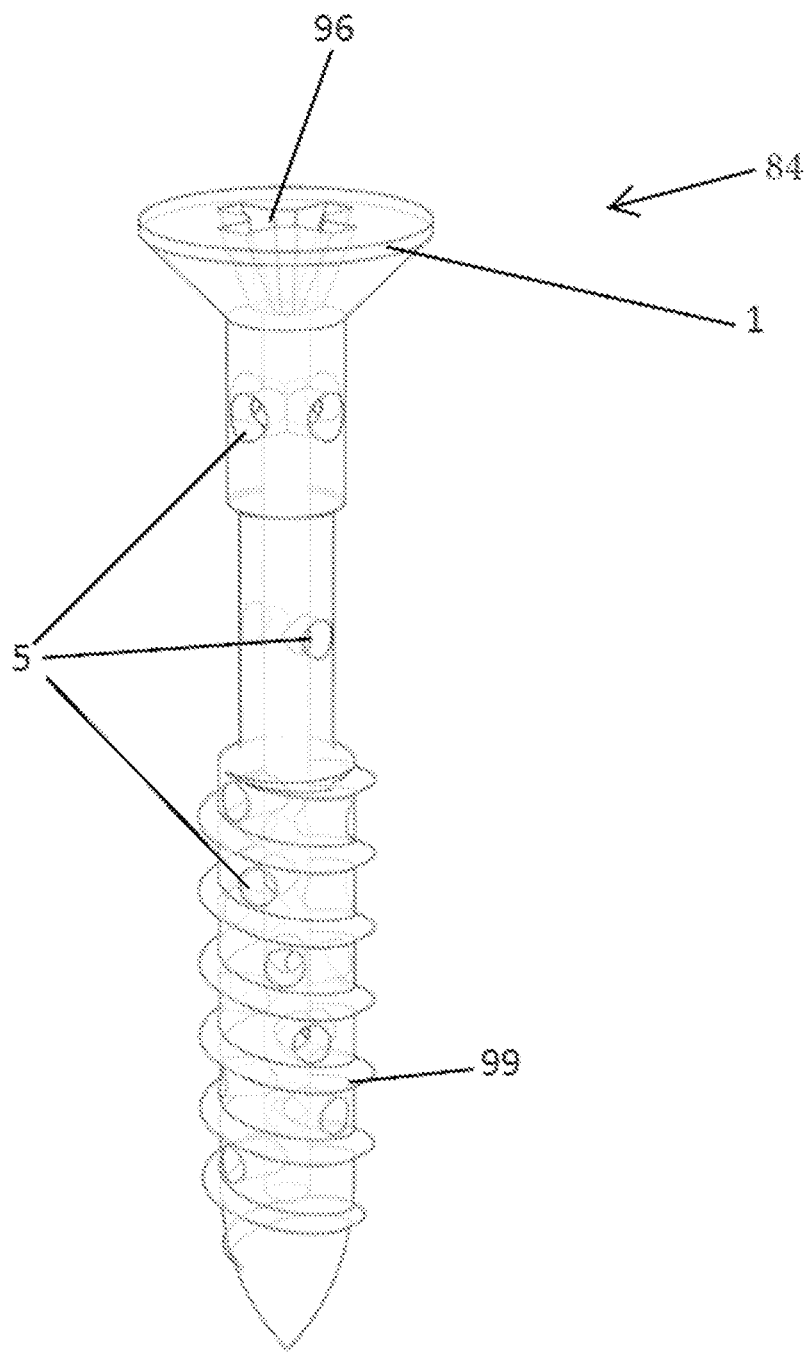
FIG. 3 is a top perspective view of the shaft portion shown in FIG. 2.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

Referring now to the drawings FIG. 1-15 there is shown a locking, clamping and injection screw for leveling adjustments.

In its most complete version, the system is made up of all the components: 1) Fastener Body comprised by: 1.*a* Fastener head with Phillips or other required screwdriver shape 2. 1.*b* body thread.1*b*.*d* flat body 1.*c* Internal liquid chanel.1.*d* recessed holes for liquid 1.*e* height channels for extendable arms 2) extendable retractable arms, dented flange and a protective cap for retractable arms The body of the fastener have height channels in which the expandable retractable arms rest and are attached. This channel is located in the middle upper narrower without thread part of the fastener and delimits the path of the retractable arms, the opening and closing of the expandable retractable arms. The fastener fixed channel for retractable arms, a pivotable and rotatable hinge, a elastic body part, side recessed holes for material expulsion through the fastener body, dented flange. The materials for the manufacturing of the fastener could vary depending on the application for which will be used as well as the distance and the size of the components. Some of the materials that can be used to manufacture could be but are not limited to are as example: Metals, Polymers, Ceramics Composites or other material required for the application. These components are combined together to create an architecture for the system that has all the attributes and protective applications for the use of the fastener.

Figure 14:
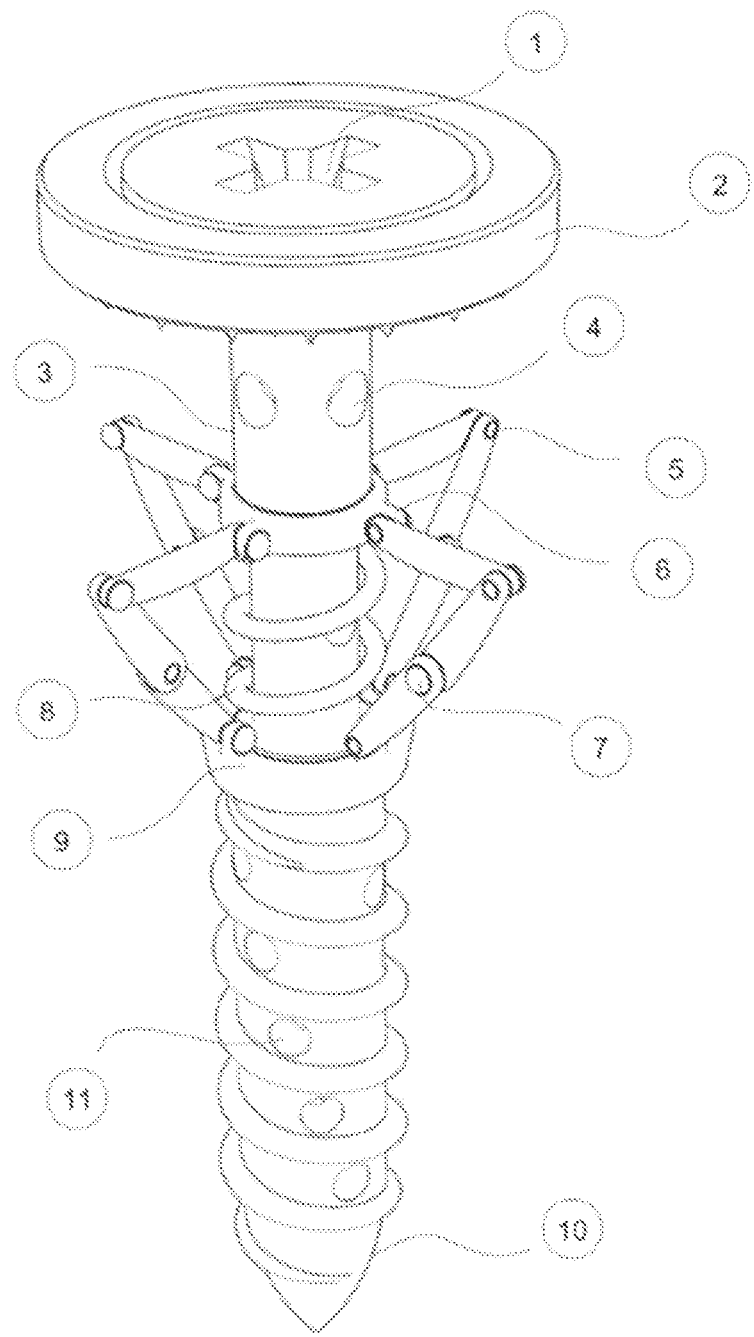
FIG. 14 is a perspective view of another embodiment of the leveling fastener according to the present invention.
Figure 15:
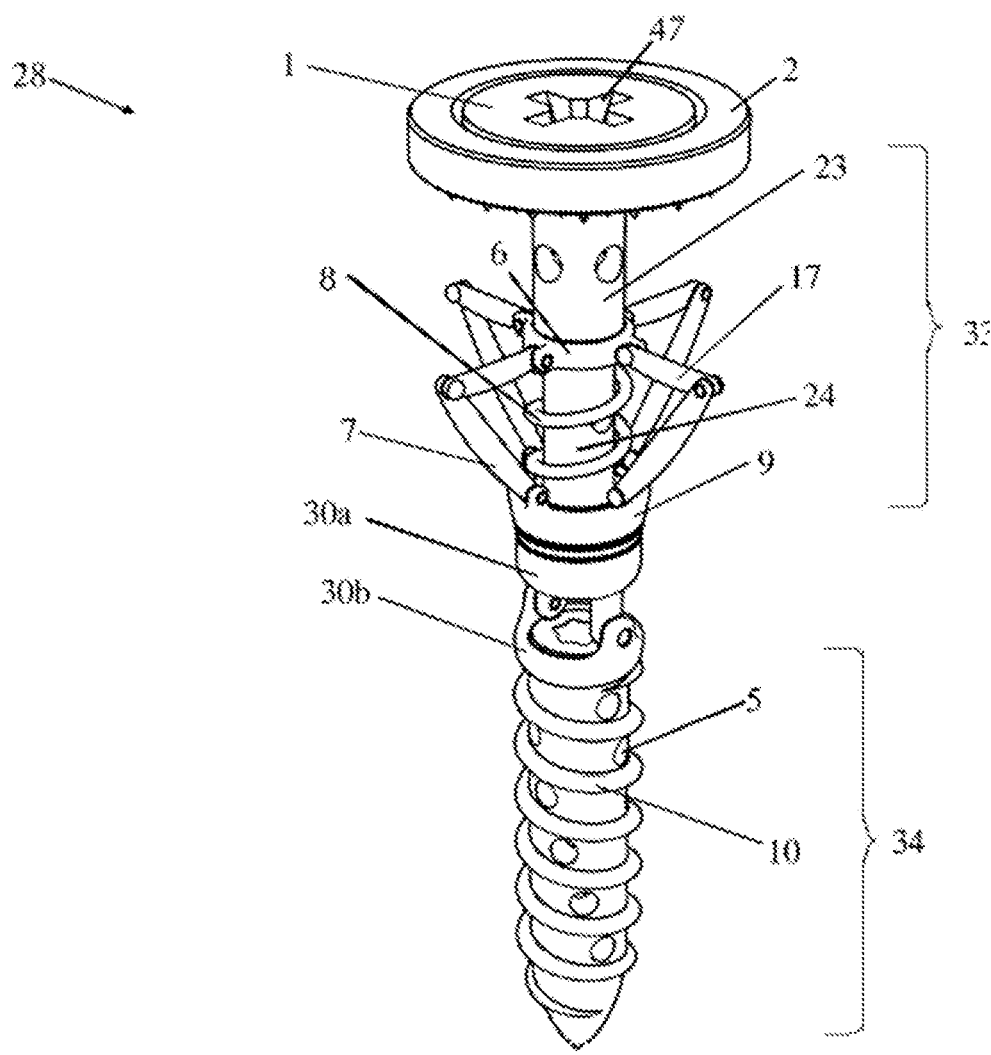
FIG. 15 is a perspective view of the leveling fastener shown in FIG. 11.
Figures 16, 17:
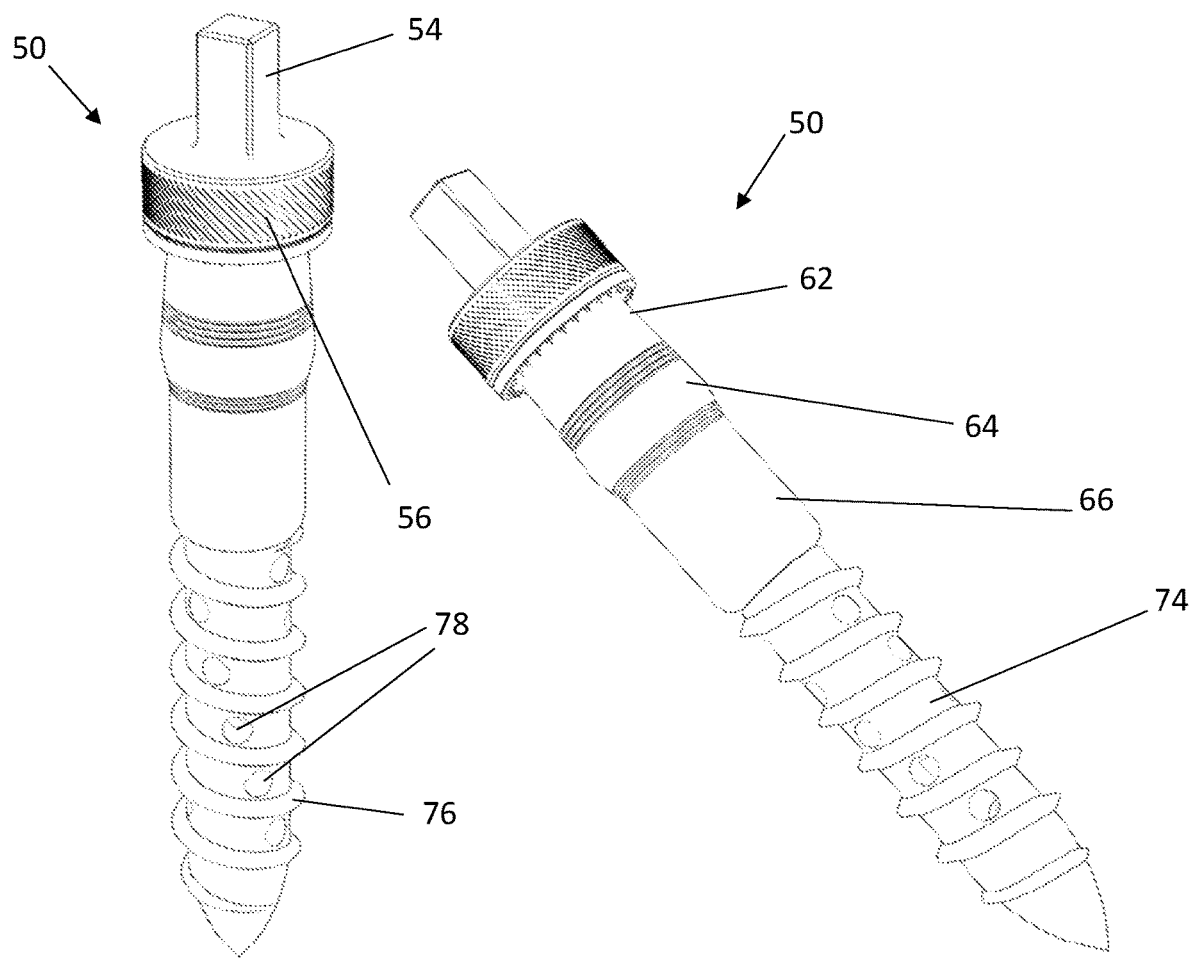
FIG. 16 is a top perspective view of a riveted leveling fastener according to the present invention.
FIG. 17 is a bottom perspective view of the faster shown in FIG. 16.
Figure 18:
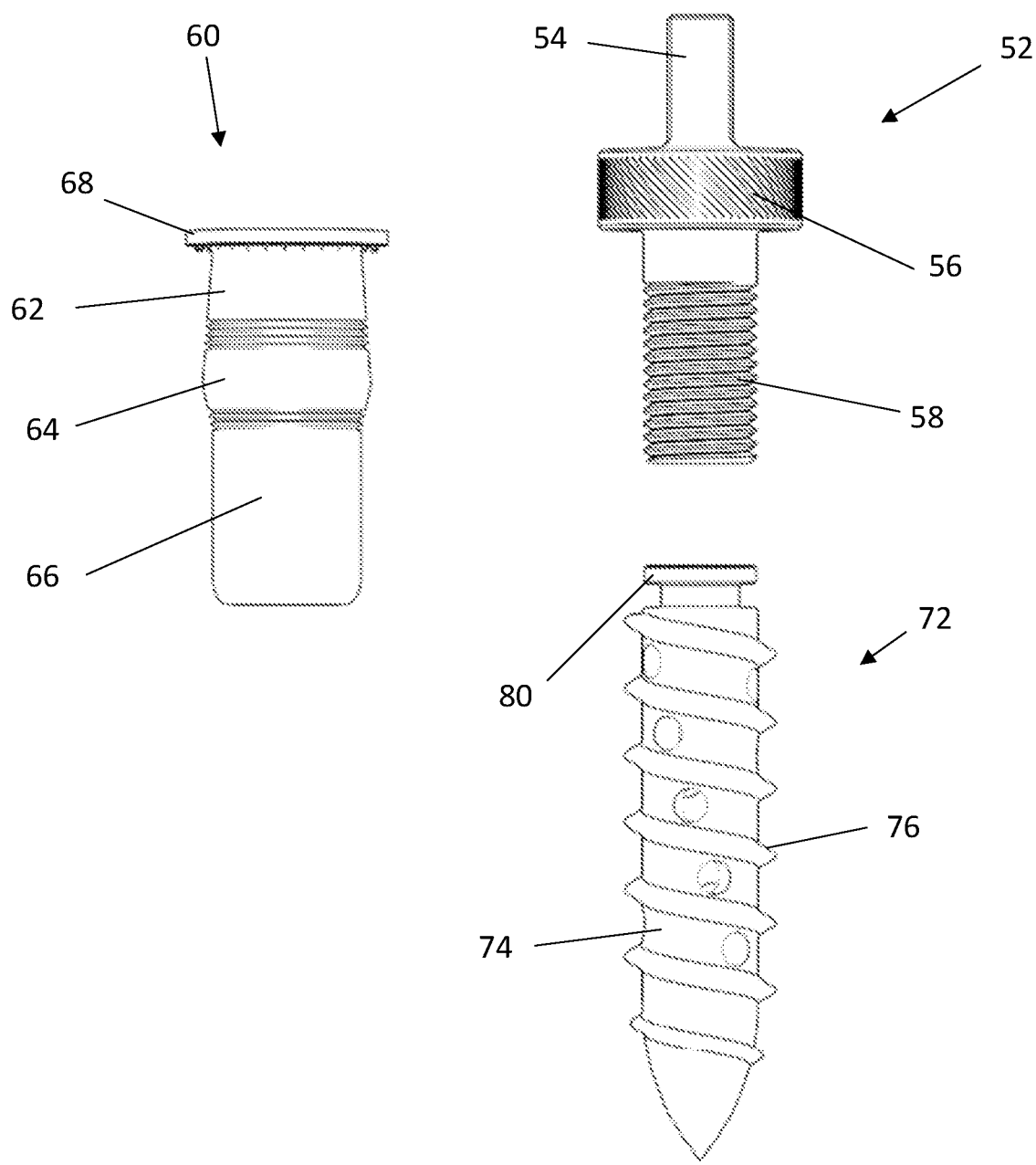
FIG. 18 is an exploded side elevational view of the fastener shown in FIG. 16.
Figure 19:
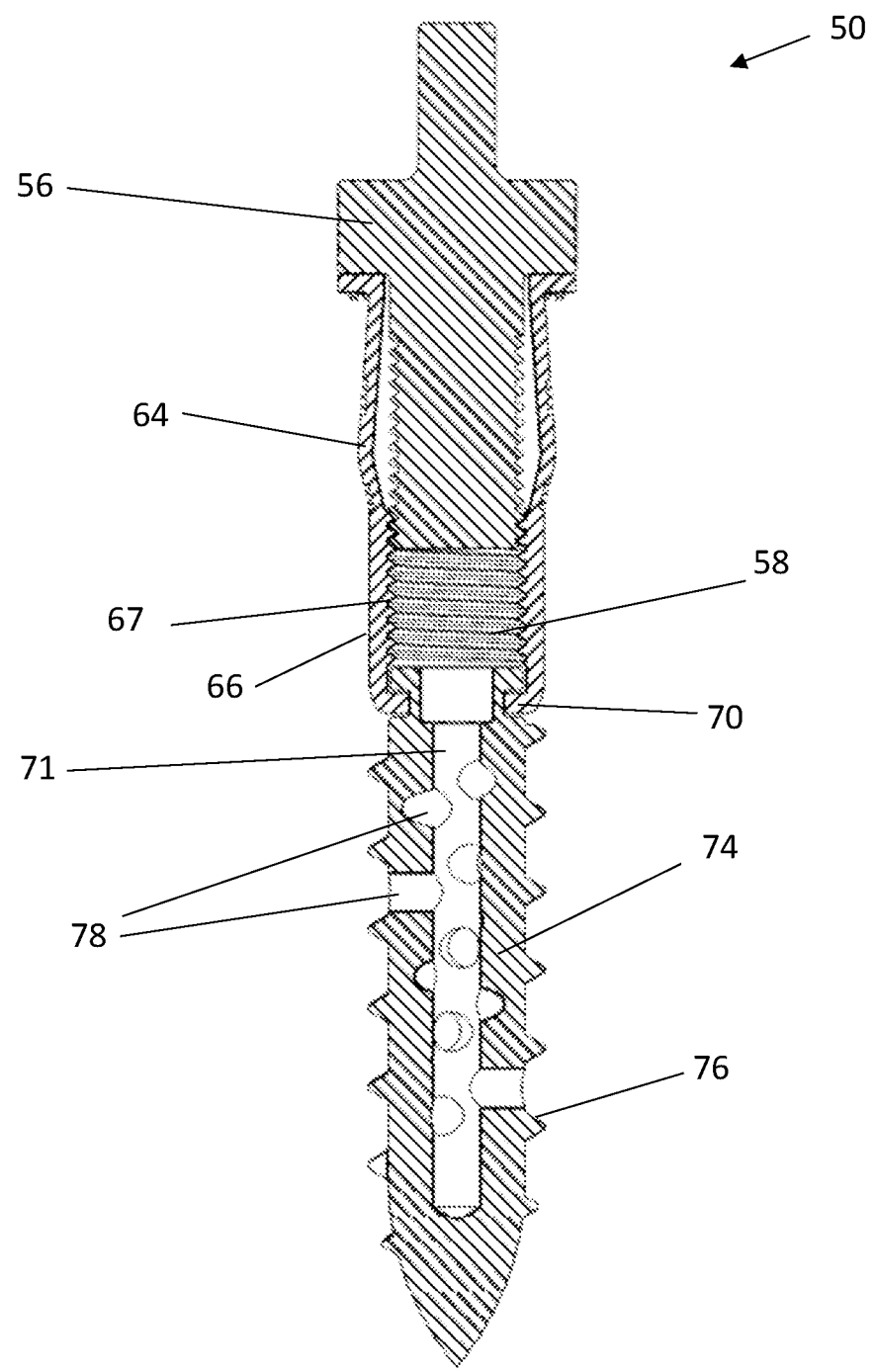
FIG. 19 is cross-sectional side elevational view of the fastener shown in FIG. 16.

The assembled fastener parts include: the body of the fastener comprised by screw head 1, the channel for retractable arms 12 mounting which is narrower than the other parts of the screw body to hold and block the path of movement of the spring 8 and the upper and lower arms holders 6 and 9, the internal liquid channel and the recessed holes for the expulsion of material 5. The assembly of the clamping and locking mechanism as follows, in the screw body the spring 8 is inserted in the channel for retractable arms 12, the lower and upper retractable arm holders 6 and 9, are assembled one on top of the spring and the other on the bottom assembling and secured them through pins, pressure, welding, gluing attachment method, thread or pressure mechanism 8, 9, the retractable arms 7 are assembled and connected in their parts through arm holder pins 11. The body of the screw have a hollow internal channel (FIG. 7) for insertion of liquid or other material and expulsed through recessed holes 5 on the sides of the fastener FIG. 14 shows the fastener with all the components of FIG. 1 plus the flange dented washer 2 including protrusions 26 and cupped portion 47 on the opposite side of the dented washer 2 than the protrusions 26.

Screw head 1, the shape for adjustment 3 may be of any shape known in the industry such as Phillips, hexagon, flat, etc., the optional dented washer 2, and the internal channel for material entry access for material injection 4.

The figures show the clamping and locking mechanism assembled which include parts 6 upper retractable arm holder 9 lower retractable arm holder, retractable arms 7, spring 8, pins 11.

The figures show the middle of the fastener is the channel for the assembly 12 of the retractable arms locking mechanism which its narrower than the bottom of the screw allowing also the upper part of the screw is narrower than the bottom, the body of the screw wide could be divided in 4 sections. In an example, bottom section thread located part of the screw, middle section or the narrower of the fastener, the upper section of the fastener is narrower than the bottom section wider than the assembly channel and the 4th section is the screw head.

The figures show the fastener internal channels of the screw for material injection and holes for expulsion of the same, the head of the fastener with a injecting device injecting material through the internal channel entry access point of the fastener and the fastener and process of injection and expulsion of material through internal channel and recessed holes.

The figures show the fastener and process of injection and expulsion of material through internal channel and recessed holes between two panels or two members. The fastener 20 includes the retractable frame 48 which, once expanded rests against the lower surface of member 100. As the fastener head 1 is rotated, the threaded portion of the shank pulls the head 1 toward the second member 102. Once the second choke 6 contacts the second member 102, the second chock is urged toward the first choke until the lower frame arm contacts the first member lower surface whereby the first member 100 is secured a fixed distance from the second member 102.

The figures show the fastener with all the components from with the optional protective cap 133 for articulated arms 12 or retractable frame 48 as well as the fastener with all the components from FIG. 1 with the optional protective cap for articulated arms.

The figures show the protective cap over the articulated arms mechanism and the functioning mechanism of the fastener in different stages of the attachment. With a drill or a screw driver the fastener is inserted through two piece that are desired to level, as the fastener pass the first piece the retractable arms will open, holding and blocking from movement the first piece, then fastener continue its path to the second piece and attach to it, the user at this moment will decide the required height for obtaining leveling between panels screwing the moving the panels up or down just tightening or untightening the fastener. The user could inject any liquid or material suitable through the internal channels that is required.

Figure 9:
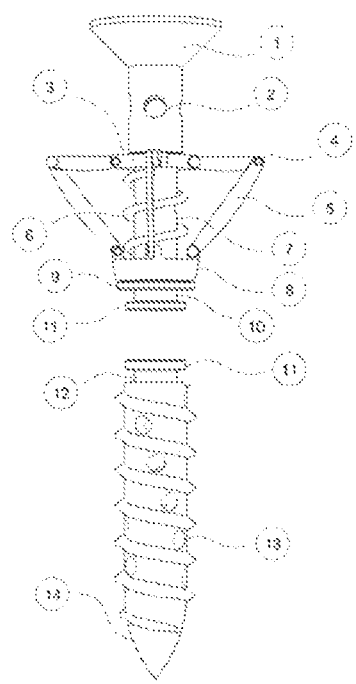
FIG. 9 is an exploded side elevational view of the leveling fastener having and upper and lower portion.
Figure 10:
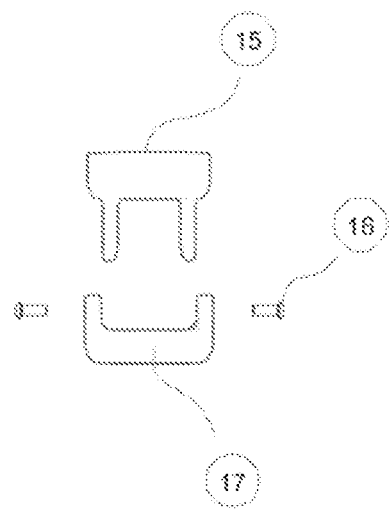
FIG. 10 is a side elevational view of the universal joint for connecting the upper and lower portions shown in FIG. 9.
Figure 11:
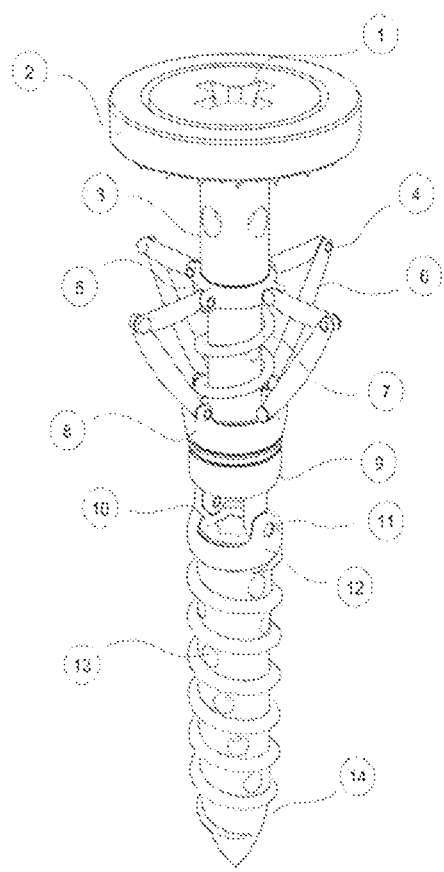
FIG. 11 is a perspective view of the fastener components shown in FIGS. 9 and 10.

FIGS. 9-11 shows a mechanism that allow the fastener to rotate 360 degrees in the axis and allow the fastener to adjust the position lateral by an added pivotable and rotatable hinge 15,16,17 that is attached to the body of the lower and upper part of the screw by two channels were are inserted by pressure in lower part channel 12, 11 and upper part 10, 11 in which for uses that require rotation and flexion similar as example as a human elbow or wrist movement.

The figures show a fastener variation for rotation and lateral position adjustment assembled with upper view of the fastener lower part head 10 were the screw its tightened through especial flexible screwdriver with Phillips or other required screwdriver shape.

Figure 12:
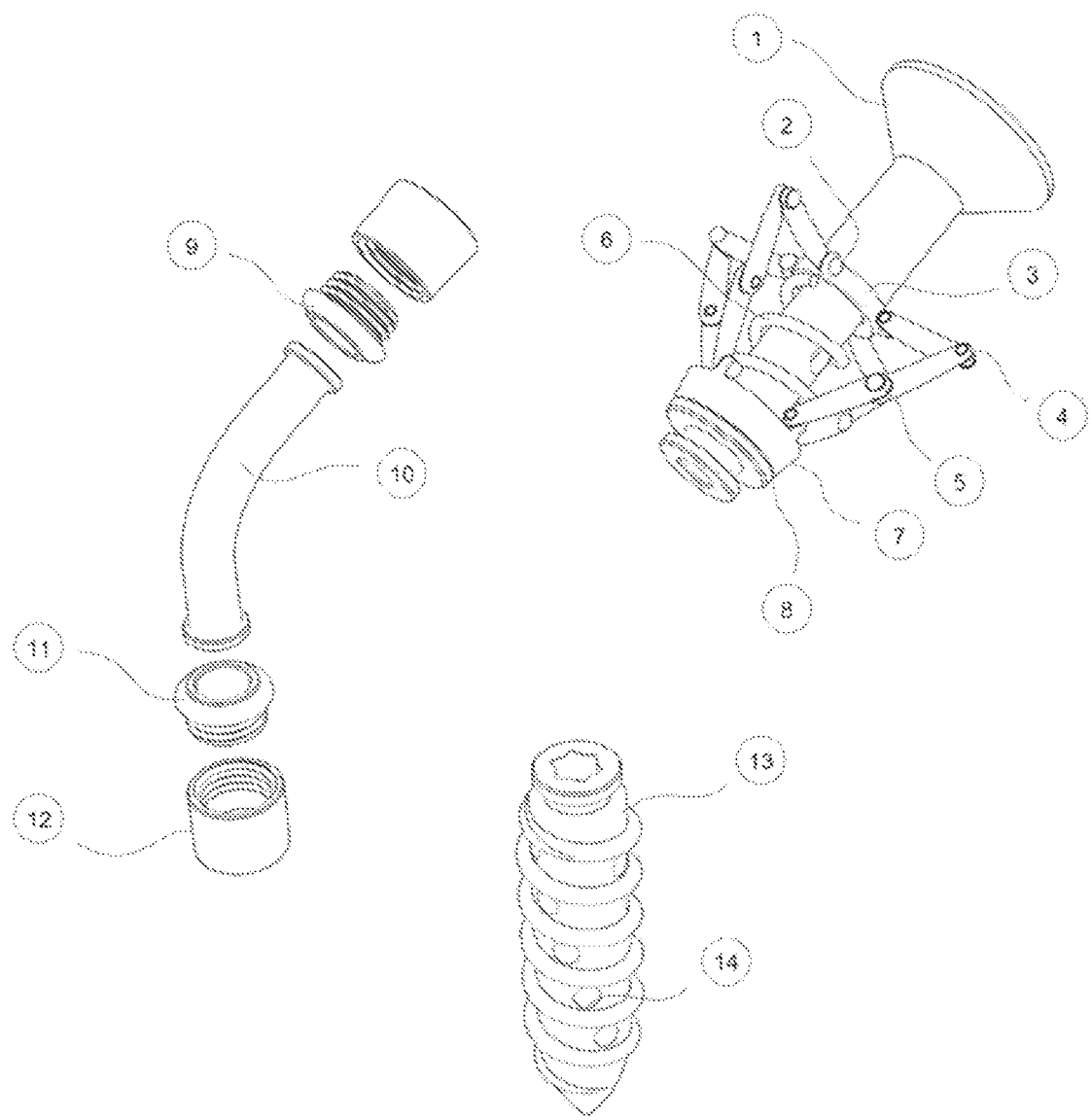
FIG. 12 is an exploded perspective view of an angled fastener based on the embodiment shown in FIG. 1.
Figure 13:
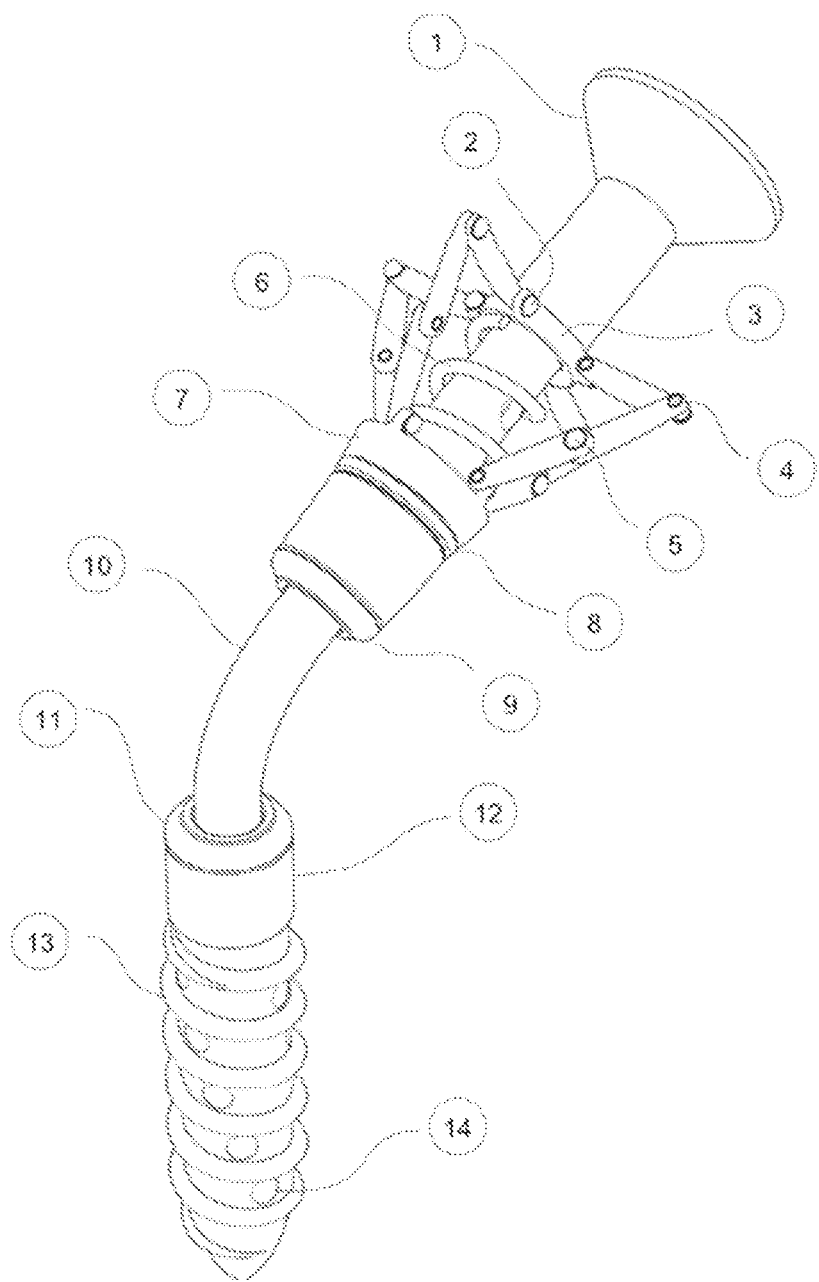
FIG. 13 is a perspective view of the fastener shown in FIG. 12.
Figure 20:
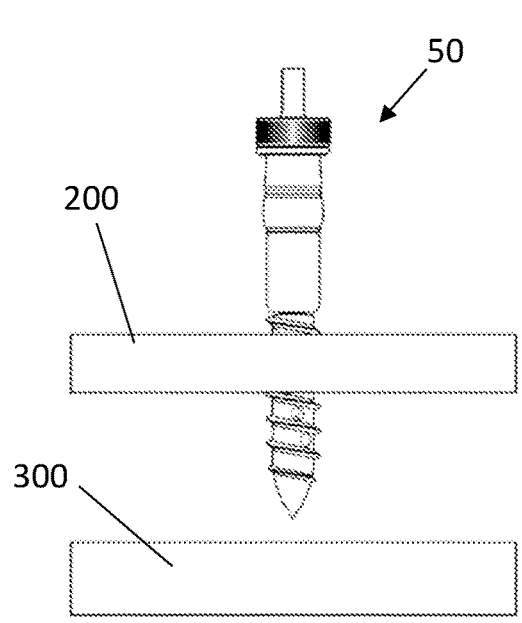
FIG. 20 shows a first step in using the fastener shown in FIG. 16.
Figure 21:
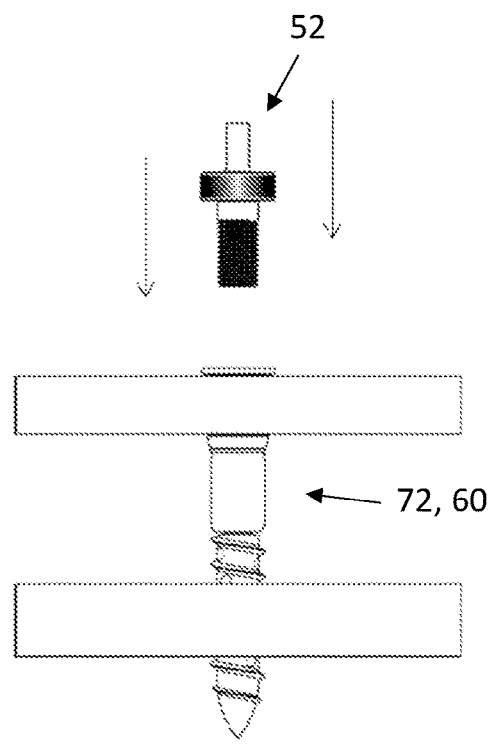
FIG. 21 shows a second step in using the fastener shown in FIG. 16.

FIGS. 12 and 13 show variation of the fastener body with a middle elastic attachment composed by an elastic hose 10 a threaded insert for hose attachment and seal 9, 11 and the threaded and pressure connector 12 to attach the hose to the lower and upper part of the screw channels. For uses that require a compression and level adjustment letting the pieces having flexibility in movement as example a human elbow or wrist will move. FIG. 20 Shows screw with elastic body feature variation assembled.

The locking, clamping and injection screw for leveling adjustments described above is one embodiment of the leveling fastener according to the present invention.

Figure 7:
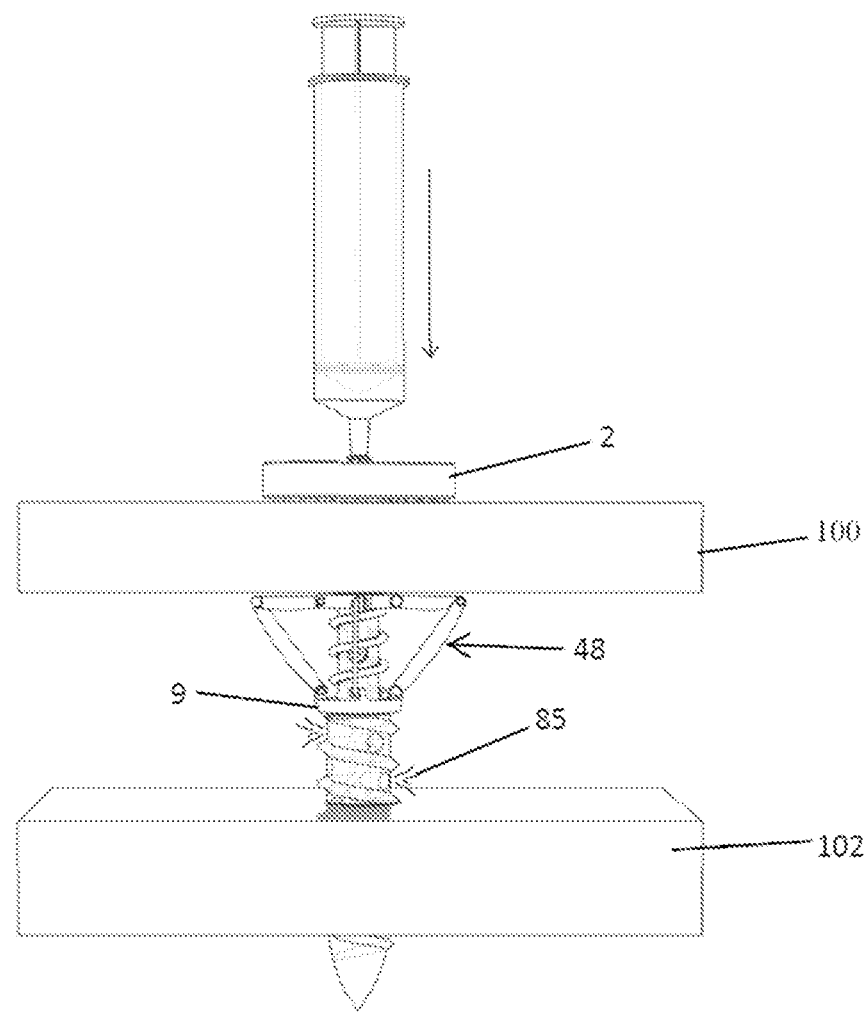
FIG. 7 is a side view of injection of material injection through internal fastener channel and liquid expulsion holes.
Figure 8:
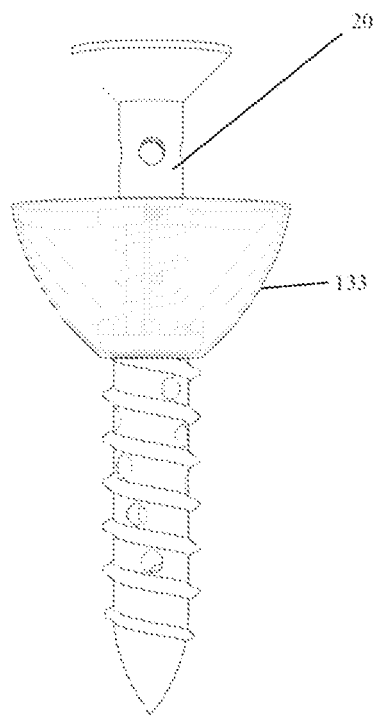
FIG. 8 is a side elevational view of the fastener frame having a protective cover.
Figure 22:
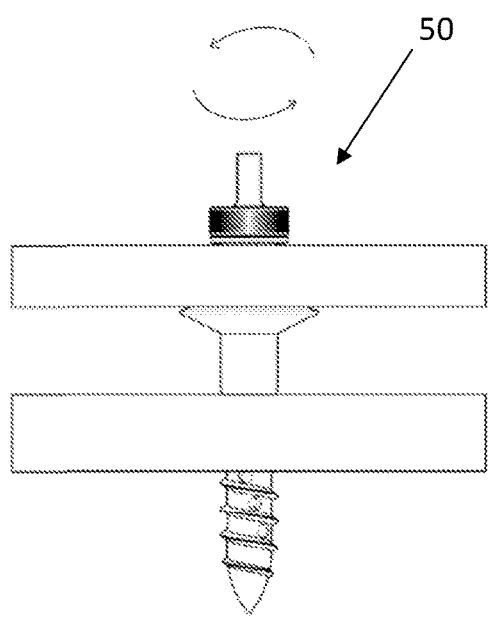
FIG. 22 shows a third step in using the fastener shown in FIG. 16.

Another aspect of the present invention is directed to a fastener as shown in FIG. 22. The fastener 20 includes a cylindrical shank having a first shank end and a second shank end opposite the first shank end. The cylindrical shank has a head attached to the first shank end, the head having a tool slot. An example of the tool slot is shown at the top of FIG. 7. The tool slot is for engaging a tool and is directed away from the first shank end. The head has a lower head surface adjacent the shank. The cylindrical shank has a head collar 1 adjacent the head, a threaded collar 10 having securing threads, the threaded collar 10 disposed along a portion of the second shank end. The cylindrical shank has a shank smooth portion 12 disposed between the head collar 1 and the threaded collar 10. A thread shelf 22 terminates one end of the threaded portion and a tapered thread terminates the opposite end. The fastener has a grip washer 2 disposed along the head collar 1. The grip washer 2 has a first washer side with a plurality of protrusions and a second washer side having a profile corresponding with the lower head surface, wherein the grip washer 2 is rotatable about the head collar 1 and the lower head surface. The fastener includes a retractable frame 20 rotatable about the shank smooth portion. The retractable frame 20 includes a first choke 6 slidingly engaged with the shank smooth portion toward the head collar and a second choke 9 slidingly engaged with the shank smooth portion toward the threaded collar. The retractable frame 20 includes a plurality of upper frame arms 19 having a first length and pivotally attached at a first upper frame arm end to the first coke and a plurality of lower frame arms 7 having a second length longer than the first length, the lower frame arms 7 pivotally attached at a first lower frame member end to the second choke. The retractable frame 20 includes a plurality of pivot pins 11 for pivotally securing each corresponding lower frame arm second end opposite the lower frame arm first end to upper frame arm second end opposite the upper frame arm first end and a spring disposed on the shank smooth portion between the first choke and the second choke wherein the spring urges the first choke away from the second choke. In securing a first member 100 to a second member 102 (FIGS. 14*a*-14*e*), the first member having a first member opening, the leveling fastener 20 is inserted through the first member opening when the retractable frame is in a collapsed position. The threaded portion engages the second member for urging the retractable frame 48 through the first member opening and subsequently expanding the retractable frame 48 from the collapsed position to an extended position, moving the first member 100 toward the second member 102 and firmly securing the first member 100 a distance from the second member 102. The leveling fastener 20 may include a shank opening extending from a first shank end to a second shank end opposite the first shank end and a plurality of extrusion opening extending across the shank length and intersecting the shank opening whereby a fluid is injected in the shank opening and distributed to each of the plurality of extrusion openings. Preferable, the shank opening extends through the head of the leveling fastener whereby a fluid can be injected into the opening at the fastener head and delivered through the extrusion openings extending cross the shank opening. The fastener may include a protective cap disposed over the retractable frame. The fastener may include a fixed path channel for control of the retractable frame.

Figure 4:
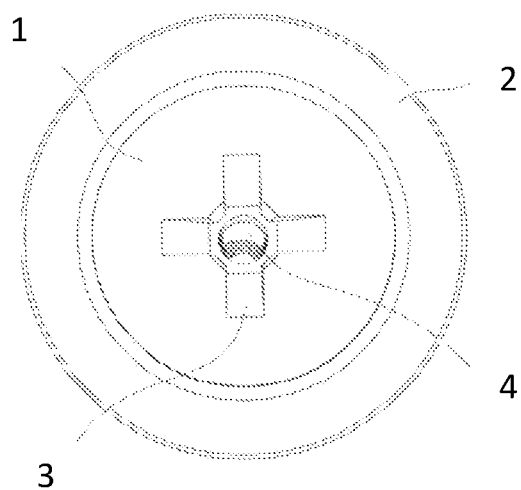
FIG. 4 is top plan view of the leveling fastener shaft portion including the dented washer.
Figure 5:
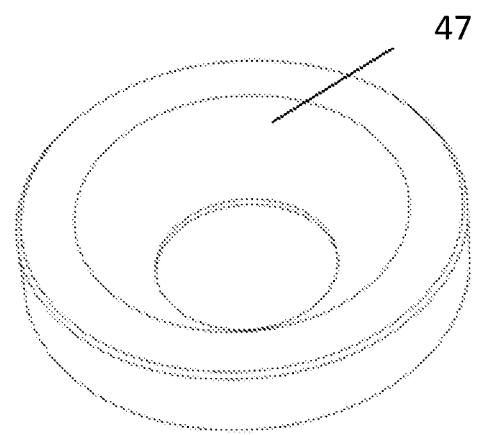
FIG. 5 is a perspective view of the dented washer cupped side.
Figure 6:
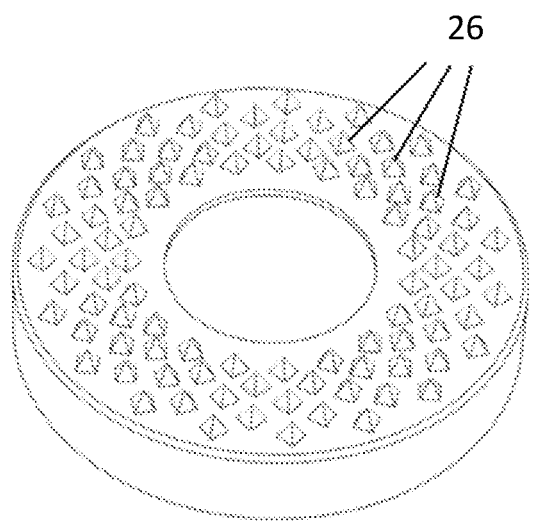
FIG. 6 is a perspective view of the dented washer dented side showing the protrusions.
Figure 23:
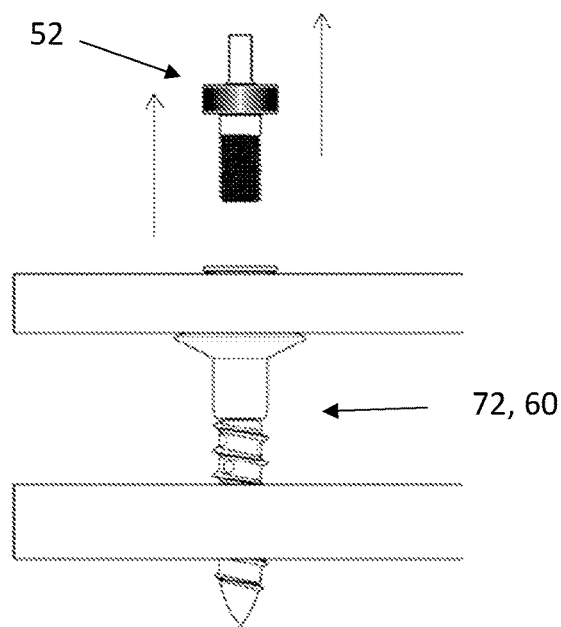
FIG. 23 shows a fourth step in using the fastener shown in FIG. 16.
Figure 24:
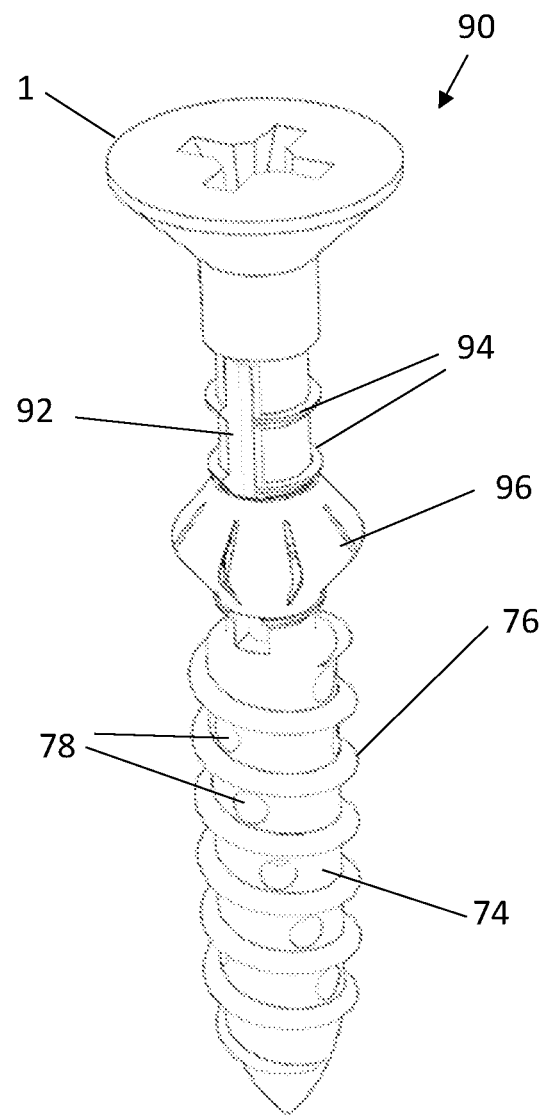
FIG. 24 is a top perspective view of a collared leveling fastener according to the present invention.
Figure 25:
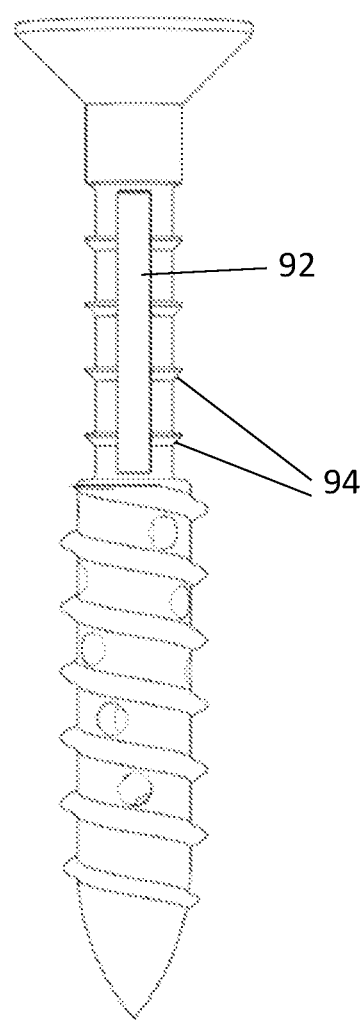
FIG. 25 is a side elevational view of the fastener shown in FIG. 24.
Figures 26, 27:
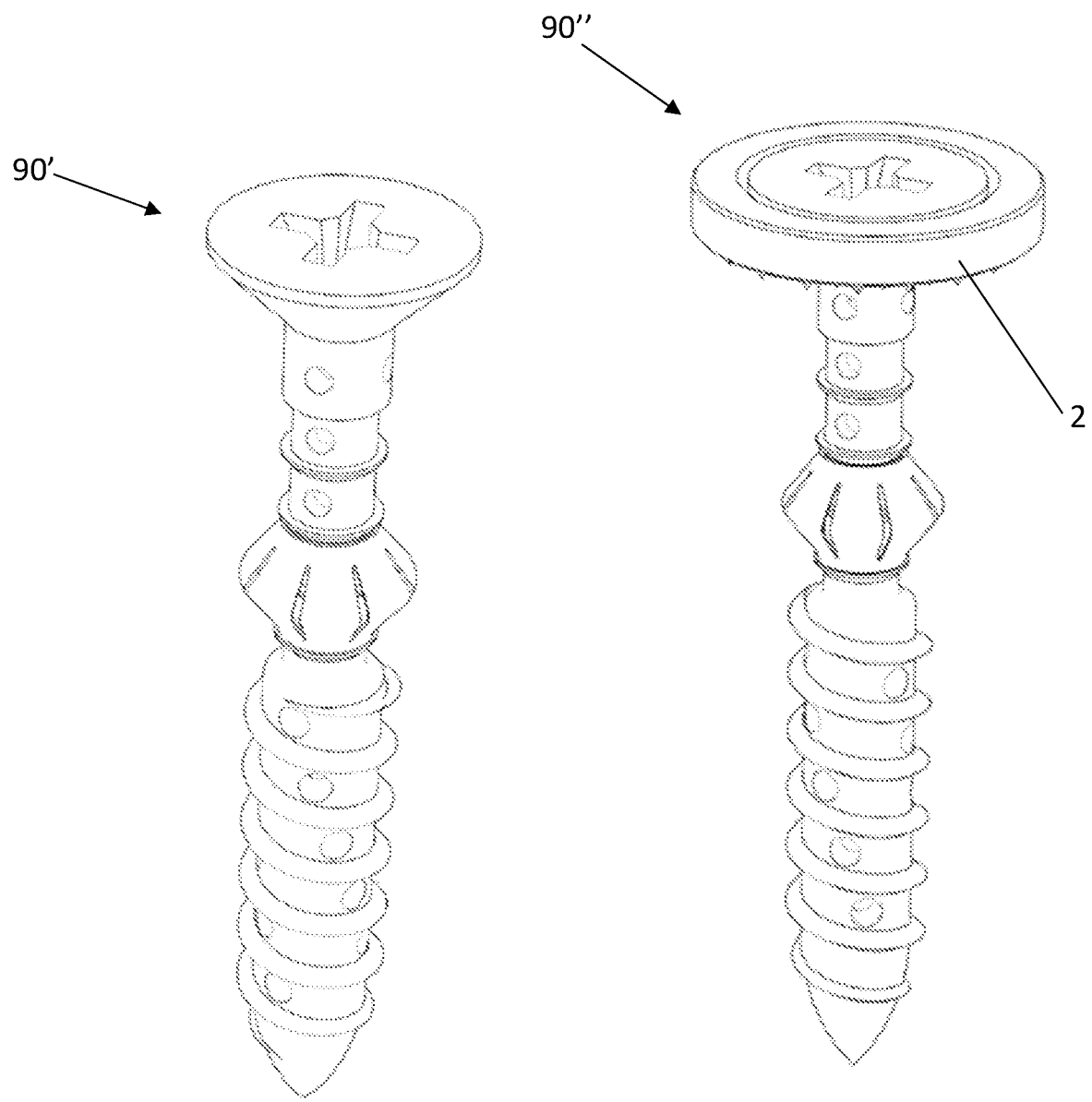
FIG. 26 is a top perspective view of an alternate embodiment of the fastener shown I FIG. 24.
FIG. 27 is a top perspective view of the faster shown in FIG. 26 having the dented washer adjacent the fastener head.

Another aspect of the present invention is directed to a fastener 28 as shown in FIG. 23. The fastener 28 includes an upper shank 70 having a first upper shank end and a second upper shank end opposite the first upper shank end and a head 1 attached to the first upper shank end. The upper shank 70 the head 1 with a tool slot 47 for engaging a tool, the tool slot 47 directed away from the shank and a lower head surface adjacent the upper shank 70. The upper shank 70 has a head collar 23 adjacent the head 1. The upper shank 70 includes a lower collar disposed proximate to the upper attachment groove and a shank smooth 24 portion disposed between head collar 23 and the thread shelf 22 or threaded collar 22. A thread shelf 22 terminates one end of the threaded portion and a tapered thread terminates the opposite end. A grip washer 2 is disposed along the collar 23. The grip washer 2 as shown in FIG. 4 has a first washer side having a plurality of protrusions and a second washer side having a profile corresponding with the lower head surface. The protrusions 26 grip the surface of the first member and the smooth bevel surface 46 corresponding with the head lower surface 47 having a profile which corresponds to the grip washer bevel 49 to allow the head to slidingly rotate against the grip washer 2. A retractable frame is rotatable about the shank smooth portion 24. The retractable frame 48 includes a first choke 6 slidingly engaged with the shank smooth portion 24 toward the head collar 23 and a second choke slidingly engaged with the shank smooth portion toward the threaded collar. The retractable frame 48 includes a plurality of upper frame arms 17 having a first length and pivotally attached at a first upper frame arm end to the first choke 6. The retractable frame 48 includes a plurality of lower frame arm 7 having a second length longer than the first length. The lower frame arms 7 are pivotally attached at a first lower frame member end to the second choke 9. There are a plurality of pivot pins 11 for pivotally securing each corresponding lower frame arm second end opposite the lower frame arm first end to upper frame arm second end opposite the upper frame arm first end. The retractable frame 48 includes a spring 8 disposed on the shank smooth portion 24 between the first choke and the second choke wherein the spring urges the first choke away from the second choke. The fastener 28 includes a lower shank 35 having a lower shank attachment groove 62 disposed adjacent one end of the lower shank and having securing threads 10 along an opposite end of the lower shank. The fastener 28 includes a rotatable hinge first portion 30a engageable with the upper shank attachment groove 60 or attachment flange 64 and a rotatable hinge second portion 30b engageable with the lower shank attachment groove 62 or attachment flange 66. The lower shank 35 is pivotably secured to the upper shank 33. The fastener 28 may include a shank opening extending from a first shank end to a second shank end opposite the first shank end and a plurality of extrusion openings 5 extending across the shank length and intersecting the shank opening whereby a fluid is injected in the shank opening, preferably into the head 1, and distributed to each of the plurality of extrusion openings 5. The fastener may include a protective cap disposed over the retractable frame. The rotatable hinge may be a flexible hose. The fastener may include a fixed path channel for control of the retractable frame.

Another aspect of the present invention is directed to a delivery fastener 84 for delivery of a fluid. The delivery fastener 84 includes a cylindrical shank having a first shank end and a second shank end opposite the first shank end, a head attached to the first shank end, the head having a tool slot 96 for engaging a tool, the tool slot 96 directed away from the first shank end and a threaded shank portion having securing threads 99, the threaded shank portion disposed along a portion of the second shank end. The cylindrical shank includes an elongated axial shank opening 86 extending from the head 1 toward the second shank end and a plurality of extrusion openings extending radially outward from the elongated axial shank opening whereby a fluid is injected in the shank opening and distributed to each of the plurality of extrusion openings. The delivery fastener may include a grip washer 2 having a first surface having protrusions 26 for gripping and a second surface having a profile corresponding to a lower surface 93 of the fastener head 1.

The delivery fastener may include a retractable frame for allocating space for extrusion of the fluid from the extrusion openings. The frame is retractable from a first position wherein the frame is in an extended position for delivery of the fluid to a second position wherein the frame is collapsed for insertion of the delivery fastener through a surface opening in a surface to be secured.

Figure 28:
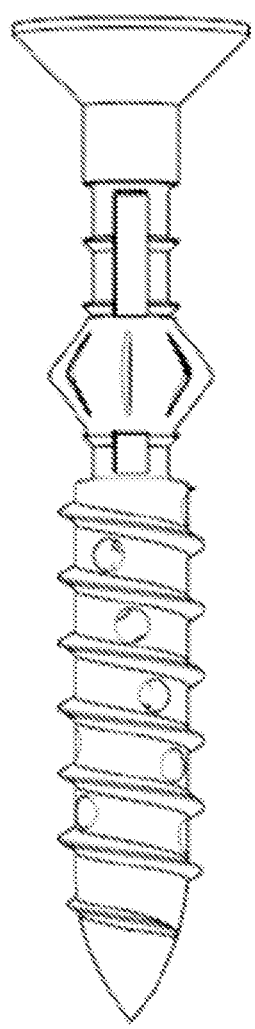
FIG. 28 is a side elevational view of the leveling faster with the collar in an axially extended position.
Figure 29:
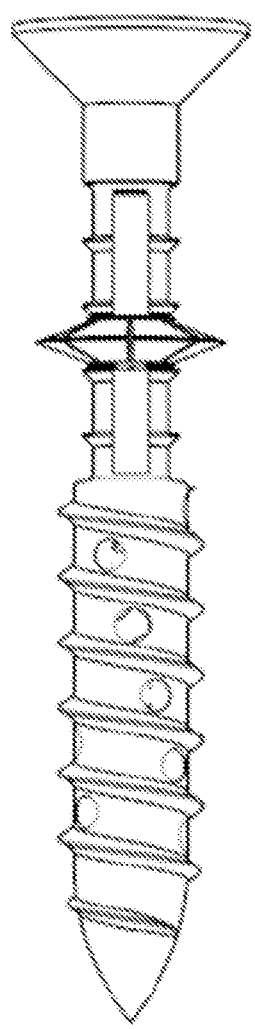
FIG. 29 is a side elevational view of the leveling faster with the collar in a radially expanded position.
Figure 30:
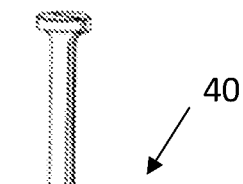
FIG. 30 is a perspective view of a rivet tool for securing the collar in a fixed position.
Figure 31:
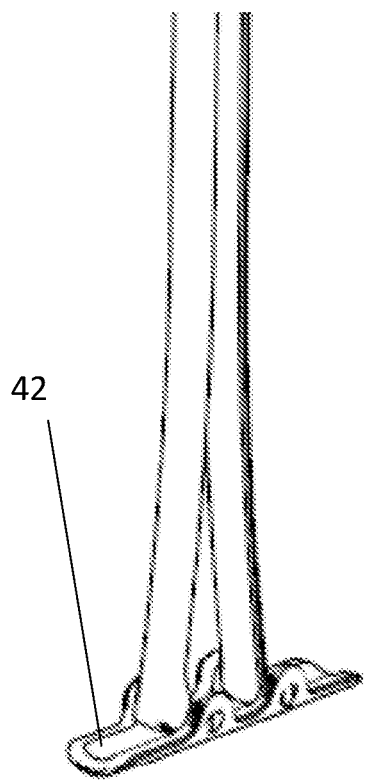
FIG. 31 is a perspective view of the rivet tool lever shown in FIG. 30.
Figure 32:
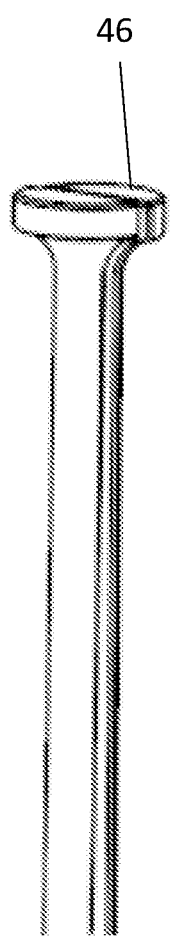
FIG. 32 is a perspective view of the rivet tool head shown in FIG. 30.
Figure 33:
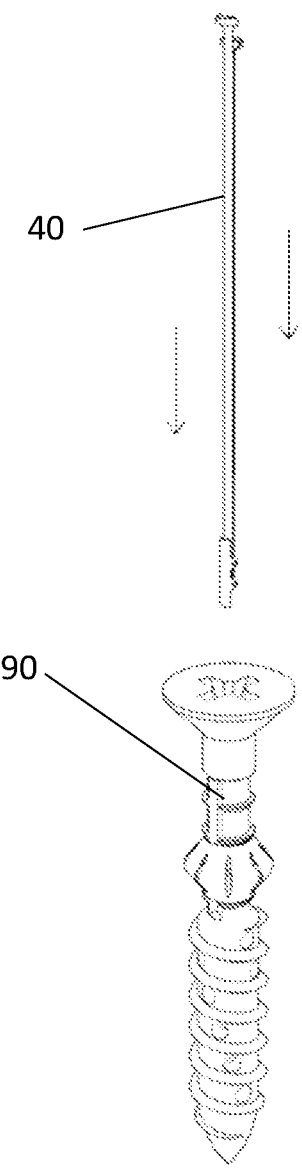
FIG. 33 shows the rivet tool being inserted in to the central channel of the leveling fastener.
Figure 34:
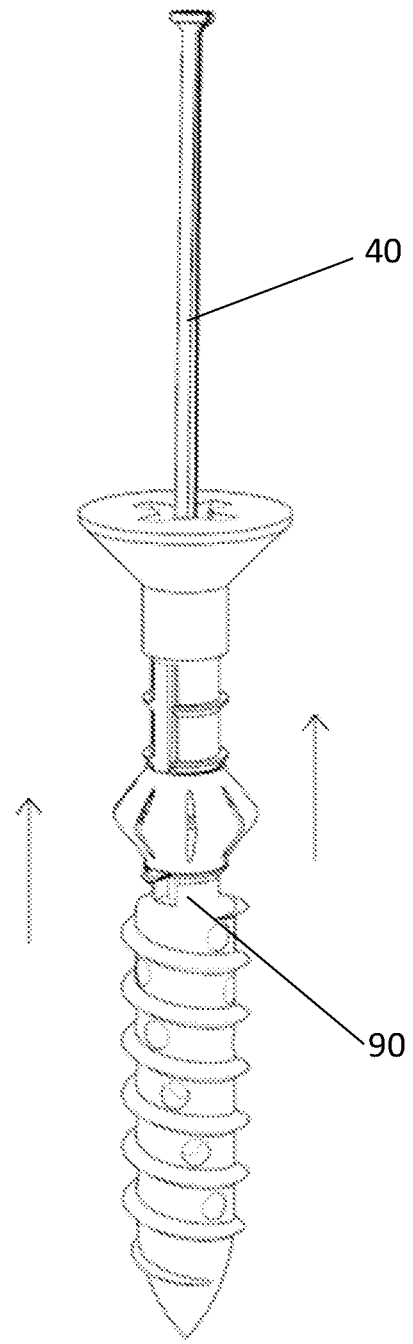
FIG. 34 shows the rivet tool adjusting the collar of the leveling fastener.
Figure 35:
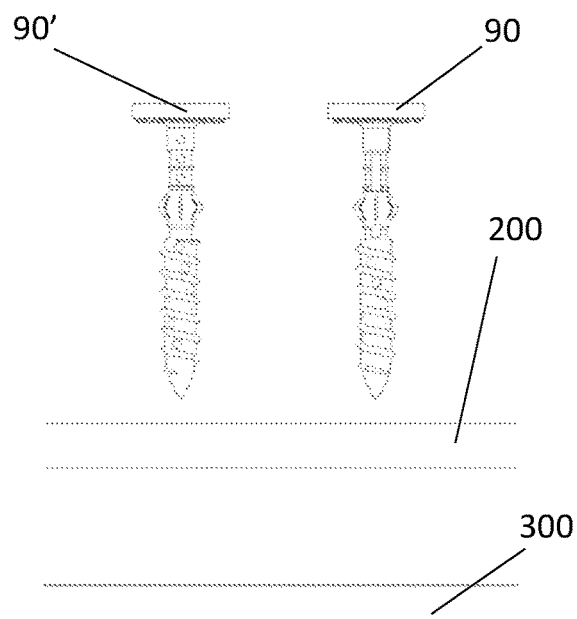
FIG. 35 shows a first step in using the leveling faster shown in FIG. 24.
Figure 36:
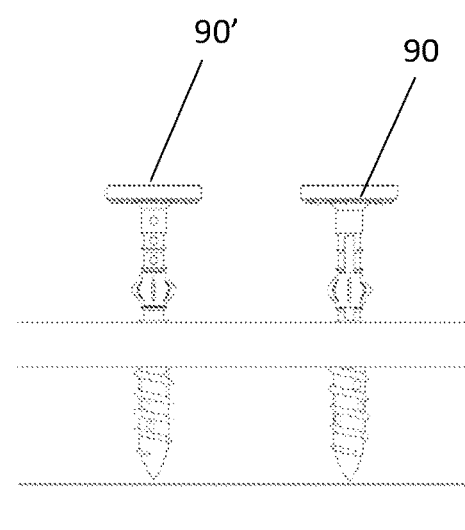
FIG. 36 shows a second step in using the leveling faster shown in FIG. 24.
Figure 37:
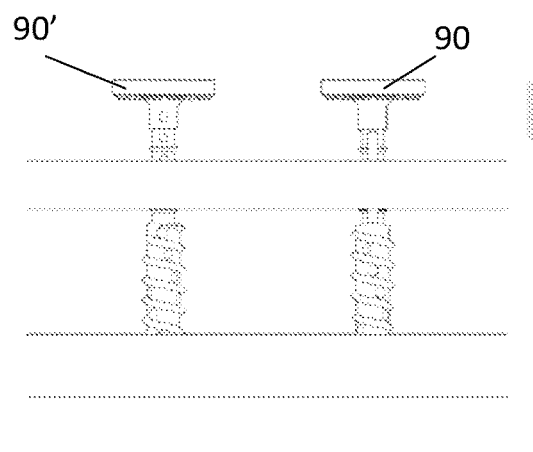
FIG. 37 shows a third step in using the leveling faster shown in FIG. 24.
Figure 38:
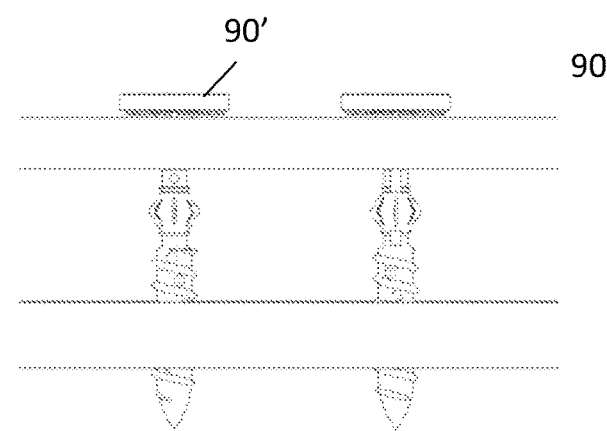
FIG. 38 shows a fourth step in using the leveling faster shown in FIG. 24.
Figure 42:
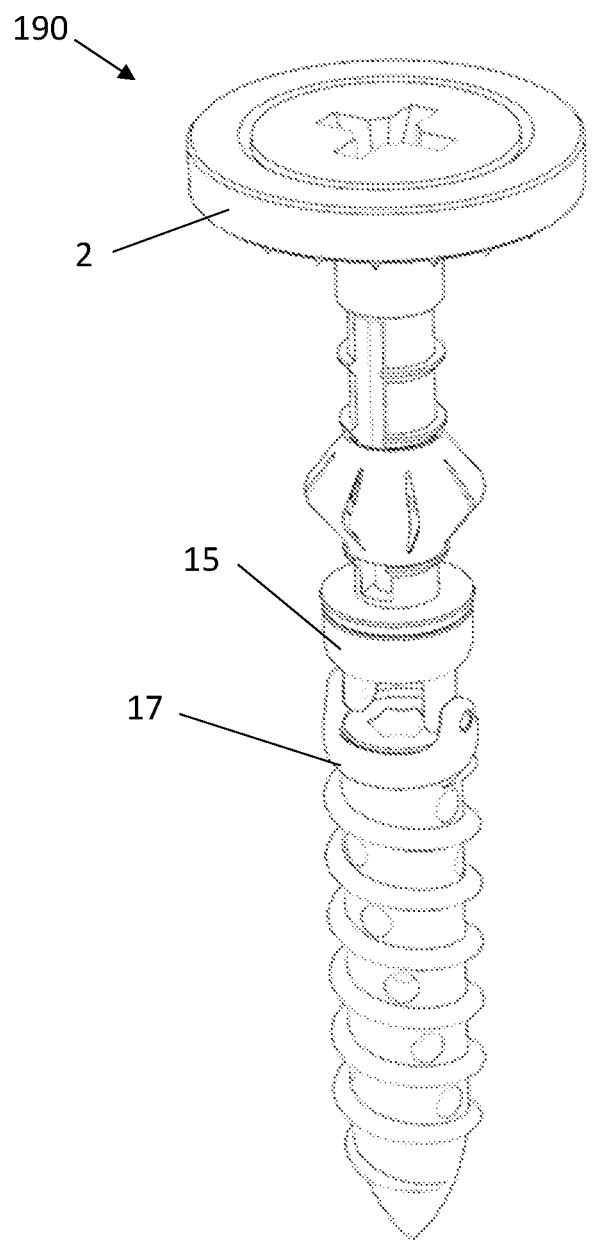
FIG. 42 shows another embodiment of the collared fastener having a slotted opening along the leveling portion of the shaft.
Figure 43:
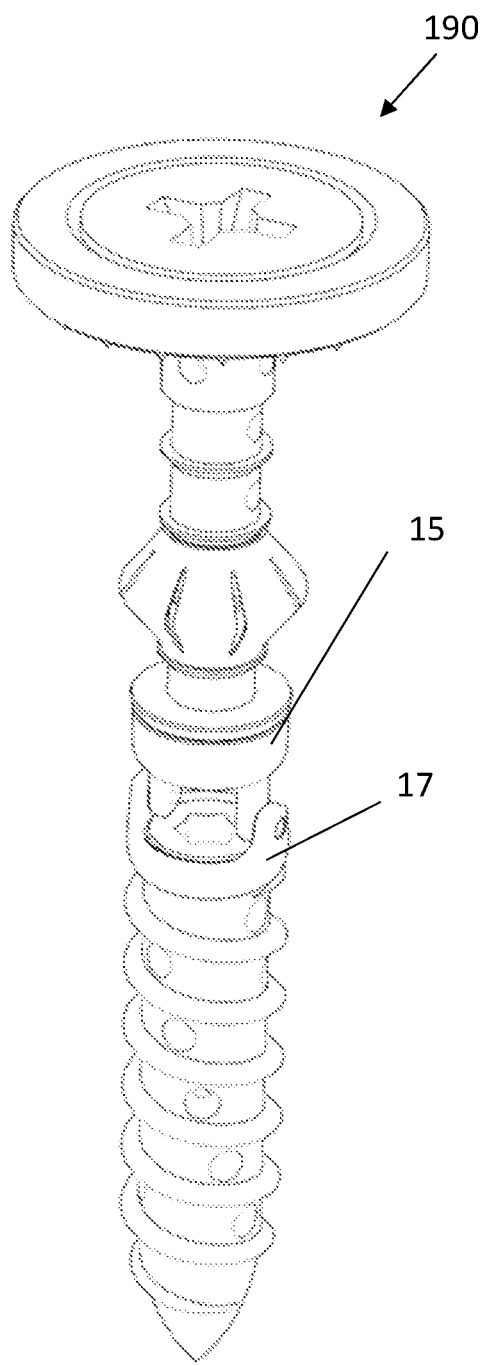
FIG. 43 shows another embodiment of the collared fastener having a plurality of openings along the leveling portion of the shaft.
Figures 46, 47:
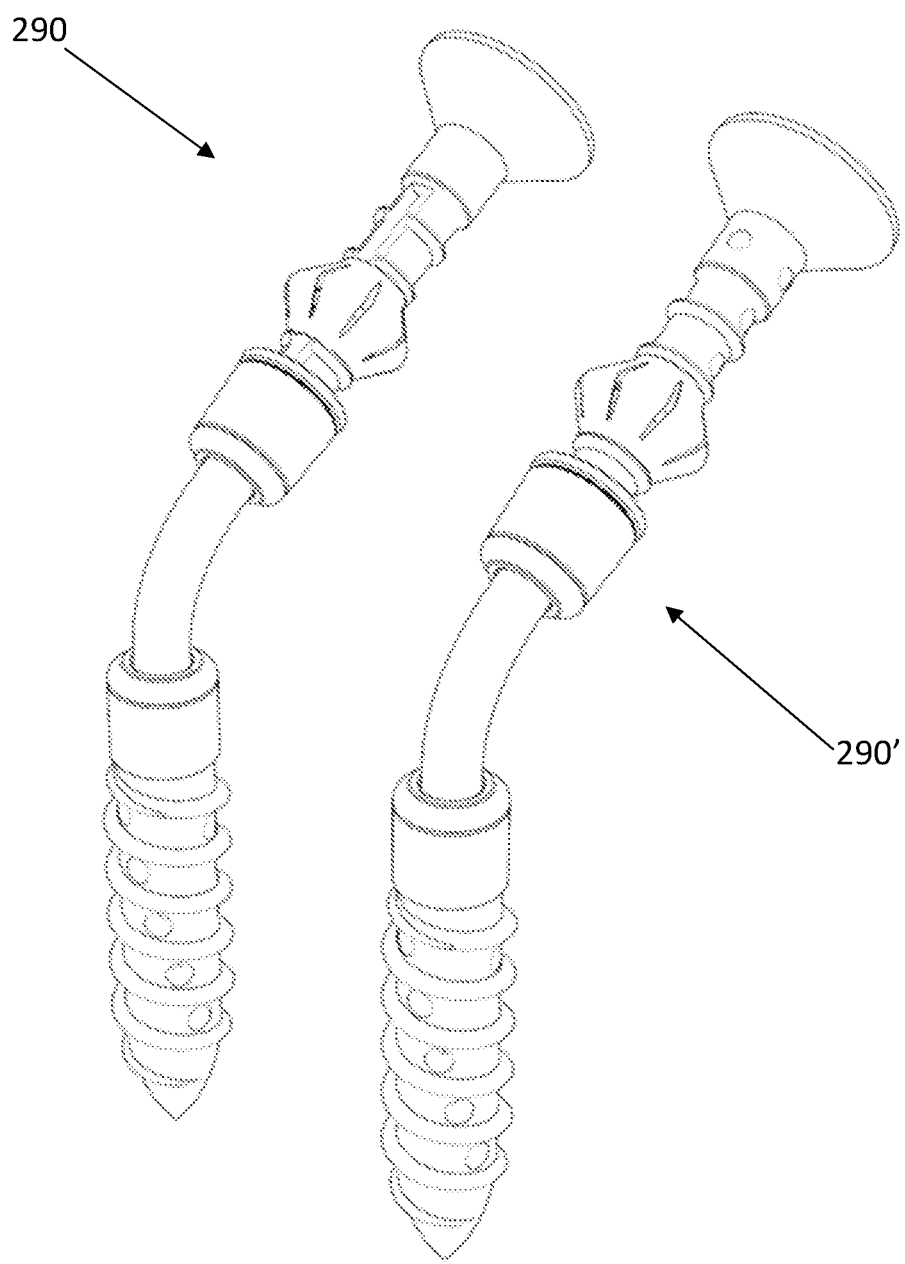
FIG. 46 is a perspective view of an alternate embodiment of the leveling fastener shown in FIG. 24.
FIG. 47 is a perspective view of an alternate embodiment of the leveling fastener having a slotted leveling portion.
Figure 48:
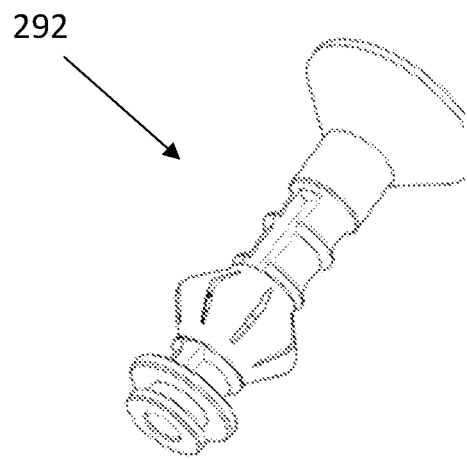
FIG. 48 is a perspective view of an alternate embodiment of the leveling fastener having a leveling portion including a plurality of openings.
Figure 49:
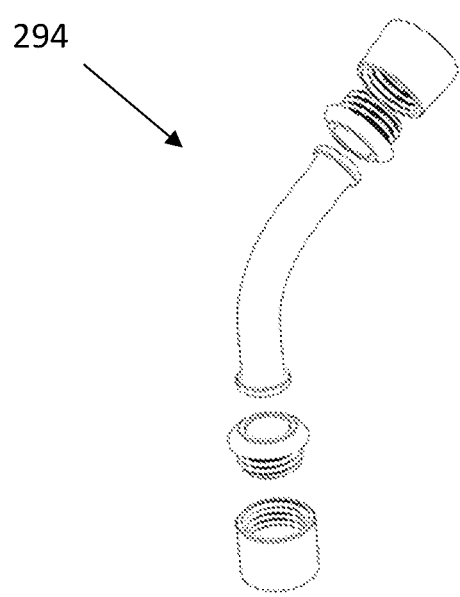
FIG. 49 is a perspective view of the angled connector shown in FIG. 46.

As shown in FIGS. 24-39 the present invention is directed to a leveling fastener 90 for adjustably securing a first member 200 to a second member 300. The leveling fastener 90 includes a cylindrical shank body 74 having a fastener head 1 disposed on a first end of the cylindrical shank body 74, the head 1 engageable with a fastening tool. The cylindrical shank body 74 includes a threaded portion having fastener threads 76 extending from a fastener tip disposed on a second end of the cylindrical shank body opposite the first end to a mid-portion of the cylindrical shank body between the first end and the second end of the cylindrical shank body 74. The cylindrical shank body 74 includes a leveling portion extending between the fastener head 1 and the threaded portion and a central channel 4 (FIG. 41) extending axially along a central axis of the cylindrical shank body 74 from the fastener head of the cylindrical shank body to at least the mid-portion of the cylindrical shank body 74. The leveling fastener 90 includes a collar 96 adjustable from a retracted position (FIG. 28) wherein the collar has a first diameter to an expanded position FIG. 29) wherein the collar has a second diameter larger than the first diameter, the collar 96 translatable along the leveling portion of the cylindrical shank body when in the collapsed position and secured from movement when the collar 96 is in the expanded position. The collar 96 is in the retracted position when the fastener threads engage a first member opening in the first member 200. The collar 96 is expanded when the fastener threads fully engage the second member 300. The first member 200 is secured between the fastener head 1 (or the dented washer 2 if the dented washer is used) and the expanded collar 96 whereby rotating the leveling fastener 90 in one direction moves the first member 200 toward the second member 300 and rotating the leveling fastener 90 in a second direction opposite the first direction moves the first member 200 away from the second member 300.

The central channel may be a fluid transport channel, the leveling fastener including at least one fluid egress port extending radially from the fluid transport channel wherein a fluid forced into the fluid transport channel at the fastener head travels through the fluid transport channel and out of the at least one fluid egress port. The fluid may be an expandable insulation, an adhesive or other construction fluid. The leveling fastener may include a slot disposed in the leveling portion and the leveling fastener may include a collar adjustment tool having a rotatable lever at one end of the collar adjustment tool, the rotatable lever extendable outwardly through a radial port extending radially from the central channel after the collar adjustment tool is guided into the central channel. The rotatable lever engages the collar wherein urging the adjustment tool away from the fastener head slides the collar toward an inner surface of the first member, locking the collar into an installed position and securing the first member between the fastener head and the collar member. Retracting the rotatable lever allows removal of the adjustment tool from the fastener central channel. The leveling fastener may include a plurality of retaining rings spaced apart and disposed on the leveling portion of the fastener, the plurality of retaining rings for retaining the collar along the leveling portion of the fastener. The leveling fastener may include a plurality of retaining rings spaced apart and disposed on the leveling portion of the fastener for retaining the collar along the leveling portion of the fastener. The collar adjustment tool allows the collar to translate along the leveling portion of the fastener when the finger is positioned in the central channel and engages the collar.

Another aspect of the present invention shown in FIGS. 35-40 is directed a method for using the leveling fastener for adjustably securing a first member to a second member. The method includes drilling a first member opening in the first member and second member opening in the second member, the first member opening axially aligned with the second member opening and engaging the head of the leveling fastener with a rotary tool. The method includes engaging the fastener threads with the first member opening and using the rotary tool, rotating the leveling fastener in a first direction wherein the leveling fastener collar is in the retracted position and the leveling fastener translates into the first member and the second member. The method includes continuing rotation of the leveling fastener until the leveling fastener collar expands, engaging the first member between the expanded collar and the head wherein one of the plurality of retaining rings locks the expanded collar against a rear surface of the first member. The method includes using the rotary tool, rotating the leveling fastener in a second direction opposite the first direction until the first member is in a desired position relative to the second member; and removing the rotary tool from the level fastener head.

The method includes providing a collar adjustment tool having a rotatable lever at one end of the collar adjustment tool, the rotatable lever extendable outwardly through a radial port extending radially from the central channel after the collar adjustment tool is guided into the central channel, the rotatable lever engageable with the collar wherein urging the adjustment tool away from the fastener head slides the collar toward an inner surface of the first member securing the first member between the fastener head and the collar member and wherein retracting the rotatable lever allows removal of the adjustment tool from the fastener central channel. The method may include drilling a first member opening in the first member and second member opening in the second member, the first member opening axially aligned with the second member opening, engaging the head of the leveling fastener with a rotary tool and engaging the fastener threads with the first member opening. The method may include using the rotary tool, rotating the leveling fastener in a first direction wherein the leveling fastener translates into the first member and the second member, sliding the collar adjustment tool rotatable lever in the in the leveling fastener central opening and rotating the lever until the lever engages the collar. The method may include pulling the collar adjustment tool away from the fastener head wherein the collar is expanded and locked against the inner surface of the first member and retracting the lever from the collar and removing the collar adjustment tool from the central opening of the leveling fastener. The method may include using the rotary tool, rotating the leveling fastener in the first direction or a second direction opposite the first direction until the first member is in a desired position relative to the second member and removing the rotary tool from the level fastener head. The leveling fastener may include a plurality of retaining rings spaced apart and disposed on the leveling portion of the fastener, the plurality of retaining rings for retaining the collar along the leveling portion of the fastener. The step of pulling the collar adjustment tool away from the fastener head locks the collar against the inner surface may include at least one retaining ring locking the collar along the leveling portion of the leveling fastener. The leveling fastener may include a shaft channel extending axially through the shaft body and at least one egress port extending radially outward from the shaft channel and wherein a fluid injected into the shaft channel flows through the shaft channel and out the egress ports.

As shown in FIGS. 16-23 another aspect of the present invention is directed to a leveling fastener 50 for adjustably securing a first member 200 to a second member 300, the leveling fastener 50 comprising a shaft portion having a shaft body 74, external shaft treads 76 extending along a portion of the shaft body 74, a shaft flange 56 extending radially outward from a flange end of the shaft portion and a tapered end opposite the flange end. The leveling fastener 50 includes a rivet portion 60 having a cylindrical tube, a rivet flange 68 extending radially outward from a first tube end of the cylindrical tube and a rivet lip 70 FIG. 19) extending radially inward from a second end of the cylindrical tube the second end opposite the first end. The rivet lip 70 is engaged with the shaft flange 80. The leveling fastener 50 includes a proximal tube portion 62 disposed adjacent the rivet flange 68, a distal tube portion 66 disposed adjacent the rivet lip 70 and a deformable portion 64 disposed between the proximal tube portion 62 and the distal tube portion 66 wherein the deformable portion 64 expands radially outward when the distal tube portion 66 is drawn toward the proximal tube portion 62 of the cylindrical tube. The external shaft treads 76 are engageable with first member 200 opening whereby rotation of the shaft portion in one direction draws the leveling fastener 50 into the first member 200 opening and into a second member 300 opening. Expansion of the deformable portion 64 secures the first member 200 between the rivet flange 68 and the expanded deformable portion 64 (FIG. 23). Further rotation of the shaft member in the first direction draws the first member 200 toward the second member 300 and rotation of the shaft member in a second direction opposite the first direction urges the first member 200 away from the second member 300.

The leveling fastener includes a shaft channel extending axially through the shaft body and at least one egress port extending radially outward from the shaft channel wherein a fluid injected into the shaft channel flows through the shaft channel and out the egress ports. The fluid may be an expandable insulation, an adhesive or other constructing fluid. The distal tube portion may include internal threads and the leveling fastener may include a removable rivet tool having a tool body having external tool threads engageable with the internal threads of the distal tube portion, a tool flange extending radially outward from the tool body and a tool head protruding from the tool flange, the tool head for rotating the removable rivet tool 52. The tool body external threads are engageable with the distal tube portion internal threads and the tool body, when rotated, urges the distal tube portion toward the proximal tube portion, locking the first member between the rivet flange and the deformable portion.

A method for using the leveling fastener is shown in FIGS. 20-23 and includes ensuring the rivet tool 52 is engaged with the proximal tube portion, drilling a first member opening in the first member 200 and second member opening in the second member 300, the first member opening axially aligned with the second member opening and engaging the tool head with a rotary tool. The method includes engaging the fastener threads 76 with the first member 200 opening, using the rotary tool, rotating the leveling fastener 50 in a first direction wherein the leveling fastener 50 translates into the first member 200 and the second member 300 and continuing to rotate the leveling fastener until the deformable portion 64 expands against an inner surface of the first member 200. The method includes using the rotary tool, rotating the leveling fastener in the first direction or a second direction opposite the first direction until the first member 200 is in a desired position relative to the second member 300 and removing the rivet tool 52 from the level fastener head. The leveling fastener may include a shaft channel extending axially through the shaft body and at least one egress port extending radially outward from the shaft channel and wherein a fluid injected into the shaft channel flows through the shaft channel and out the egress ports.

The assembly of all the items into a kit makes the installation simple and easy for the user because the parts necessary to connect the wheels of the instant invention can be assembled to the existing container without using special tools or sealants.

The present invention relates to a fastener device and a method associated with the device. With respect to the device, it is a fastener device that holds various pieces together through a blocking mechanism which block one piece at certain desired height and allows the other part of the fastener that its not blocking to continue work in its path to adjust up or down the height as the user requires. When obtaining the desired point or height the user has the possibility if required or desired to inject through a internal channel such as used in a needle to inject liquids or materials for immobilization or for other applications required. This device fastener can be used for the need of leveling and adjusting two pieces such as panels, logs, pipes, bones or any other pieces that need to be leveled without losing attachment.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

In another embodiment of the present invention a fastener includes: 2.*a* Fastener head with Phillips or other required screwdriver shape 2.*b* body thread. 1*b.d* flat body 2.*c* Internal liquid channel 2.*e* height pins track 2.*f* height pins 2.*g*. extendable retractable collar for piece locking. The body of the fastener have height channels in which the expandable retractable collar rest and is attached. This channel is located in the middle upper narrower part of the fastener and delimits the path of the retractable collar and the expansion of contraction of the collar. The materials for the manufacturing of the fastener could vary depending on the application for which will be used as well as the distance and the size of the components. Some of the materials that can be used to manufacture could be but are not limited to are as example: Metals, Polymers, Ceramics Composites or other material required for the application. These components are combined together to create an architecture for the system that has all the attributes and protective applications for the use of the fastener.

A system is made up of all the components: 1) Fastener Body comprised by: 2.*a* Fastener head with Phillips or other required screwdriver shape 2.*b* body thread. 1*b.d* flat body 2.*c* Internal liquid chanel.2.*d* recessed holes for liquid or other material expulsion.2*f* height pin track height channels for extendable arms 2*g*. Dented washer. The body of the fastener have height channels in which the expandable retractable collar rest and is attached. This channel is located in the middle upper narrower part of the fastener and delimits the path of the retractable collar and the expansion of contraction of the collar. The materials for the manufacturing of the fastener could vary depending on the application for which will be used as well as the distance and the size of the components. Some of the materials that can be used to manufacture could be but are not limited to are as example: Metals, Polymers, Ceramics Composites or other material required for the application. These components are combined together to create an architecture for the system that has all the attributes and protective applications for the use of the fastener.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A leveling fastener for adjustably securing a first member to a second member, the leveling fastener comprising:
    a shaft portion having:
        a shaft body;
        external shaft treads extending along a portion of the shaft body;
        a shaft flange extending radially outward from a flange end of the shaft portion; and
        a tapered end opposite the flange end;
    a rivet portion including:
        a cylindrical tube;
        a rivet flange extending radially outward from a first tube end of the cylindrical tube;
        a rivet lip extending radially inward from a second end of the cylindrical tube the second end opposite the first end wherein the rivet lip is engaged with the shaft flange;
        a proximal tube portion disposed adjacent the rivet flange;
        a distal tube portion disposed adjacent the rivet lip; and
        a deformable portion disposed between the proximal tube portion and the distal tube portion wherein the deformable portion expands radially outward when the distal tube portion is drawn toward the proximal tube portion of the cylindrical tube;

wherein the external shaft treads are engageable with first member opening whereby engaging the flange end with a rotary tool to rotate the shaft portion in a first direction draws the leveling fastener into the first member opening and into a second member opening;

wherein expansion of the deformable portion secures the first member between the rivet flange and the expanded deformable portion; and wherein further rotation of the shaft member using the rotary tool, in the first direction draws the first member toward the second member and rotation of the shaft member using the rotary tool, in a second direction opposite the first direction urges the first member away from the second member.

2. The leveling fastener according to claim 1 including a shaft channel extending axially through the shaft body and at least one egress port extending radially outward from the shaft channel wherein a fluid injected into the shaft channel flows through the shaft channel and out the egress ports.

3. The leveling fastener according to claim 2 wherein the fluid is an expandable insulation.

4. The leveling fastener according to claim 2 wherein the fluid is an adhesive.

5. The leveling fastener according to claim 1 wherein the distal tube portion includes internal threads and the leveling fastener incudes a removable rivet tool having:
- a tool body having external tool threads engageable with the internal threads of the distal tube portion;
- a tool flange extending radially outward from the tool body; and
- a tool head protruding from the tool flange, the tool head for rotating the removable rivet tool;

wherein the tool body external threads are engageable with the distal tube portion internal threads and the tool body, when rotated, urges the distal tube portion toward the proximal tube portion, locking the first member between the rivet flange and the deformable portion.

* * * * *